US010233549B2

(12) United States Patent
Ono et al.

(10) Patent No.: US 10,233,549 B2
(45) Date of Patent: Mar. 19, 2019

(54) PHOTO-ELECTROCHEMICAL REACTION DEVICE

(71) Applicant: KABUSHIKI KAISHA TOSHIBA, Minato-ku (JP)

(72) Inventors: Akihiko Ono, Kita (JP); Satoshi Mikoshiba, Yamato (JP); Yuki Kudo, Yokohama (JP); Ryota Kitagawa, Setagaya (JP); Jun Tamura, Yokohama (JP); Eishi Tsutsumi, Kawasaki (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 266 days.

(21) Appl. No.: 15/255,739

(22) Filed: Sep. 2, 2016

(65) Prior Publication Data

US 2016/0369414 A1 Dec. 22, 2016

Related U.S. Application Data

(63) Continuation of application No. PCT/JP2015/001008, filed on Feb. 26, 2015.

(30) Foreign Application Priority Data

May 20, 2014 (JP) .................................. 2014-104619

(51) Int. Cl.
*C25B 9/08* (2006.01)
*C25B 15/02* (2006.01)
(Continued)

(52) U.S. Cl.
CPC ................ *C25B 9/08* (2013.01); *C25B 1/003* (2013.01); *C25B 1/10* (2013.01); *C25B 3/04* (2013.01);
(Continued)

(58) Field of Classification Search
CPC .. C25B 1/003; C25B 1/10; C25B 3/04; C25B 9/00; C25B 9/08; C25B 15/02; Y02P 20/135; Y02E 60/366; Y02E 70/10
See application file for complete search history.

(56) References Cited

U.S. PATENT DOCUMENTS 6,305,442 B1 10/2001 Ovshinsky et al.
2006/0016215 A1 1/2006 Tonkovich et al.
(Continued)

FOREIGN PATENT DOCUMENTS

CN 1420940 5/2003
EP 1 749 745 A1 2/2007
(Continued)

OTHER PUBLICATIONS

International Search Report dated May 19, 2015 in PCT/JP2015/001008, filed Feb. 26, 2015 (with English Translation).
Written Opinion dated May 19, 2015 in PCT/JP2015/001008, filed Feb. 26, 2015.

*Primary Examiner* — Ciel P Thomas
(74) *Attorney, Agent, or Firm* — Oblon, McClelland, Maier & Neustadt, L.L.P.

(57) ABSTRACT

To convert light into a chemical substance with high conversion efficiency. A device, comprising: a photovoltaic layer having a first face and a second face; an oxidation electrode layer electrically connected to the first face of the photovoltaic layer; a reduction electrode layer electrically connected to the second face of the photovoltaic layer; a first electrolytic solution being supplied to the oxidation electrode layer; a second electrolytic solution being supplied to the reduction electrode layer; and a porous layer, provided to in contact with at least one of the first electrolytic solution and the second electrolytic solution, having fine pores through which a product produced by the oxidation reaction or the reduction reaction passes, and being given a temperature gradient wherein the product being purified by the porous layer.

15 Claims, 11 Drawing Sheets

(51) Int. Cl.
  *C25B 9/00* (2006.01)
  *C25B 1/00* (2006.01)
  *C25B 1/10* (2006.01)
  *C25B 3/04* (2006.01)

(52) U.S. Cl.
  CPC ............... *C25B 9/00* (2013.01); *C25B 15/02* (2013.01); *Y02E 60/366* (2013.01); *Y02E 70/10* (2013.01); *Y02P 20/135* (2015.11)

(56) References Cited

U.S. PATENT DOCUMENTS

2013/0008800 A1   1/2013   Lakkaraju et al.
2013/0284591 A1   10/2013  Delahaye et al.

FOREIGN PATENT DOCUMENTS

| | | |
|---|---|---|
| JP | 61-200814 | 9/1986 |
| JP | 3-30663 | 2/1991 |
| JP | 10-290017 | 10/1998 |
| JP | 2003-528790 | 9/2003 |
| JP | 2008-507394 | 3/2008 |
| JP | 2010-255018 | 11/2010 |
| JP | 2011-94194 | 5/2011 |
| JP | 2014-503689 | 2/2014 |
| KR | 10-2013-0138281 | 12/2013 |
| KR | 10-2014-0050037 | 4/2014 |
| WO | WO 01/34861 A1 | 5/2001 |
| WO | WO 2012/084738 A2 | 6/2012 |
| WO | WO 2013/006710 A2 | 1/2013 |

US 10,233,549 B2

PHOTO-ELECTROCHEMICAL REACTION DEVICE

CROSS-REFERENCE TO RELATED APPLICATIONS

This application is a continuation of prior International Application No. PCT/JP2015/001008 filed on Feb. 26, 2015, which is based upon and claims the benefit of priority from Japanese Patent Application No. 2014-104619 filed on May 20, 2014; the entire contents of all of which are incorporated herein by reference.

FIELD

Embodiments described herein relate generally to a photoelectrochemical reaction device.

BACKGROUND

In recent years, an artificial photosynthesis technology of electrochemically converting sunlight into a chemical substance in imitation of photosynthesis of plants is under development from viewpoints of energy problem and environmental problem. The case of converting the sunlight into the chemical substance and storing it in a cylinder or tank has advantages that the storage cost of energy can be reduced and the storage loss is small as compared with the case of converting the sunlight into electricity and storing it in storage batteries.

As a photoelectrochemical reaction device that electrochemically converts sunlight to a chemical substance, there has been known, for example, a two-electrode type device that includes an electrode having a reduction catalyst for reducing carbon dioxide ($CO_2$) and an electrode having an oxidation catalyst for oxidizing water ($H_2O$), and in which these electrodes are immersed in water in which $CO_2$ is dissolved. These electrodes are electrically connected to each other via an electric wire or the like. In the electrode having the oxidation catalyst, $H_2O$ is oxidized by light energy, whereby oxygen ($1/2 O_2$) is obtained and a potential is obtained. In the electrode having the reduction catalyst, by obtaining the potential from the electrode in which the oxidation reaction is caused, $CO_2$ is reduced and formic acid (HCOOH) or the like is produced.

A photoelectrochemical reaction device using a stack (silicon solar cell or the like) which includes a pair of electrodes and a photovoltaic layer sandwiched between the pair of electrodes is also under investigation. In the electrode on a light irradiated side, water ($2H_2O$) is oxidized by light energy, whereby oxygen ($O_2$) and hydrogen ions ($4H^+$) are obtained. In the opposite electrode, by using the hydrogen ions ($4H^+$) generated in the electrode on the light irradiated side and a potential ($e^-$) generated in the photovoltaic layer, hydrogen ($2H_2$) or the like is obtained as a chemical substance.

As described above, production of a chemical substance high in utilization such as oxygen, hydrogen, and a carbon compound such as formic acid and so on from the sunlight is performed in the photoelectrochemical reaction device. However, considering energy problem and environmental problem, it is further required to increase the kinds of products, improve their qualities, and improve the conversion efficiency and so on.

DETAILED DESCRIPTION

A photoelectrochemical reaction device in an embodiment, comprising: a photovoltaic layer having a first face and a second face opposite each other and performing charge separation by energy of light irradiated to the first face or the second face; an oxidation electrode layer, electrically connected to the first face of the photovoltaic layer, causing an oxidation reaction of water; a reduction electrode layer, electrically connected to the second face of the photovoltaic layer, causing a reduction reaction of at least one of water and carbon dioxide; a first electrolytic solution containing the water and being supplied to the oxidation electrode layer; a second electrolytic solution containing at least one of the water and the carbon dioxide and being supplied to the reduction electrode layer; and a porous layer, being provided to contact with at least one of the first electrolytic solution and the second electrolytic solution, having fine pores through which a product produced by the oxidation reaction or the reduction reaction passes and being given a temperature gradient wherein the product being purified by the porous layer.

First Embodiment

Figure 1:
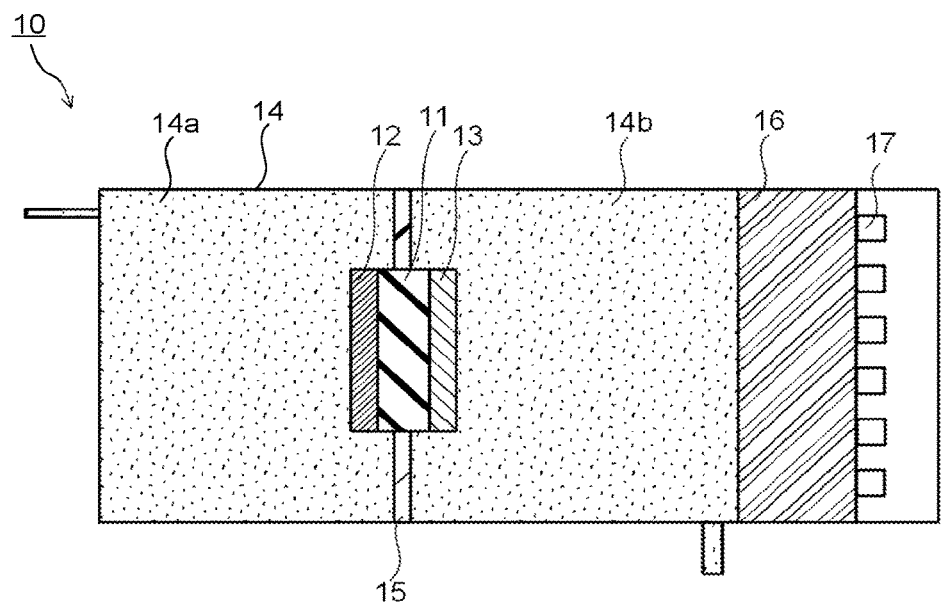
FIG. 1 is a schematic view illustrating a configuration example of a photoelectrochemical reaction device in a first embodiment.

FIG. 1 is a schematic view illustrating a configuration example of a photoelectrochemical reaction device. A photoelectrochemical reaction device 10 illustrated in FIG. 1 includes a photovoltaic layer 11, an oxidation electrode layer 12, a reduction electrode layer 13, an electrolytic solution 14, an ion exchange membrane 15, a porous layer 16, and a product flow path 17.

The photovoltaic layer 11 has a function of performing charge separation by energy of irradiated light such as sunlight or the like. Holes generated by the charge separation move to the oxidation electrode layer 12 side and electrons move to the reduction electrode layer 13 side. This allows the photovoltaic layer 11 to generate electromotive force. The photovoltaic layer 11 has a first face and a second face opposite each other. As the photovoltaic layer 11, for example, a photoelectric conversion layer of a pn-junction type or a pin junction type can be used. Note that the photovoltaic layer 11 may be formed by stacking a plurality of photoelectric conversion layers.

Figure 2:
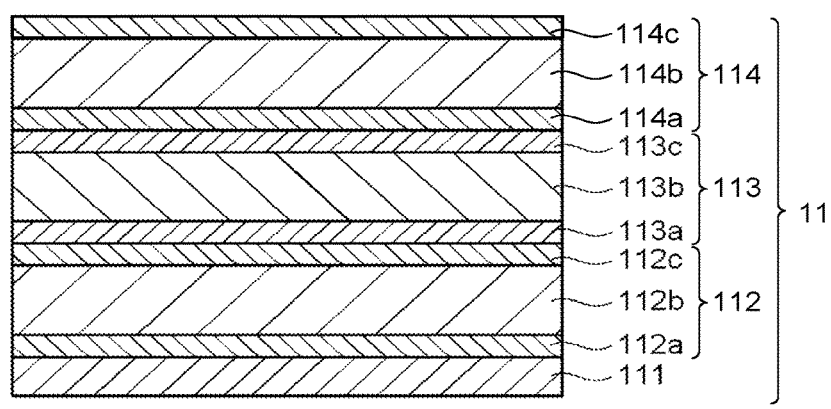
FIG. 2 is a schematic view illustrating a configuration example of a photovoltaic layer.

FIG. 2 is a schematic view illustrating a configuration example of the photovoltaic layer 11. The photovoltaic layer 11 illustrated in FIG. 2 includes a reflective layer 111, a photoelectric conversion layer 112, a photoelectric conversion layer 113, and a photoelectric conversion layer 114. Note that the reflective layer 111 does not have to be provided.

The reflective layer 111 is made of a material having light reflectivity. As the reflective layer 111, for example, a distributed Bragg reflection layer composed of a stack of metal layers or semiconductor layers can be exemplified. Provision of the reflective layer 111 makes it possible to reflect light, which has not been absorbed by the photoelectric conversion layer 112 to the photoelectric conversion layer 114, so as to make the light incident on any of the photoelectric conversion layer 112 to the photoelectric conversion layer 114, thereby increasing the conversion efficiency from light to a chemical substance.

As the reflective layer 111, a layer of metal such as Ag, Au, Al, Cu, or an alloy containing at least one of these metals can be exemplified. Note that the reflective layer 111 may be a stack composed of a first reflective layer and a second reflective layer. In this case, the first reflective layer has light reflectivity and electrical conductivity, and the second reflective layer has a light transmitting property. As the first reflective layer, the above-described metal material or alloy can be used. The second reflective layer is provided for enhancing the light reflectivity by adjusting the optical distance. The second reflective layer is preferably formed of a material having a light transmitting property and capable of coming into ohmic contact with an n-type semiconductor layer. As the second reflective layer, a layer of a light transmissive metal oxide such as indium tin oxide (ITO), zinc oxide (ZnO), fluorine-doped tin oxide (FTO), aluminum-doped zinc oxide (AZO), or antimony-doped tin oxide (ATO), can be exemplified.

The photoelectric conversion layer 112 is provided on the reflective layer 111. The photoelectric conversion layer 112 includes an n-type semiconductor layer 112a made of n-type amorphous silicon (a-Si), an i-type semiconductor layer 112b made of intrinsic amorphous silicon germanium (a-SiGe), and a p-type semiconductor layer 112c made of p-type microcrystalline silicon (μc-Si) which are stacked in order from the lower side. The i-type semiconductor layer 112b is a layer that absorbs light in a short wavelength range of about 400 nm. Therefore, in the photoelectric conversion layer 112, charge separation is caused by energy of the light in the short wavelength range.

The photoelectric conversion layer 113 is provided on the photoelectric conversion layer 112. The photoelectric conversion layer 113 includes an n-type semiconductor layer 113a made of n-type a-Si, an i-type semiconductor layer 113b made of intrinsic a-SiGe, and a p-type semiconductor layer 113c made of p-type microcrystalline-Si which are stacked in order from the lower side. The i-type semiconductor layer 113b is a layer that absorbs light in an intermediate wavelength range of about 600 nm. Therefore, in the photoelectric conversion layer 113, charge separation is caused by energy of the light in the intermediate wavelength range.

The photoelectric conversion layer 114 is provided on the photoelectric conversion layer 113. The photoelectric conversion layer 114 includes an n-type semiconductor layer 114a made of n-type a-Si, an i-type semiconductor layer 114b made of intrinsic a-SiGe, and a p-type semiconductor layer 114c made of p-type microcrystalline-Si which are stacked in order from the lower side. The i-type semiconductor layer 114b is a layer that absorbs light in a long wavelength range of about 700 nm. Therefore, in the photoelectric conversion layer 114, charge separation is caused by energy of the light in the long wavelength range.

The p-type semiconductor layer or the n-type semiconductor layer is formed by adding an element which becomes a donor or an acceptor to a semiconductor material. Note that in the photovoltaic layer 11 illustrated in FIG. 2, a semiconductor layer containing silicon, germanium or the like is used as the semiconductor layer, but not limited to them, for example, a compound semiconductor layer or the like can be used. As the compound semiconductor layer, a semiconductor layer containing, for example, GaAs, GaInP, AlGaInP, CdTe, or CuInGaSe, can be used. Further, a semiconductor layer such as $TiO_2$ or $WO_3$ may be used as long as it is capable of photoelectric conversion. Further, each semiconductor layer may be monocrystalline, polycrystalline, or amorphous. Further, the photoelectric conversion layer may be provided with a zinc oxide layer.

In the photovoltaic layer 11 illustrated in FIG. 2, the upper surface of the p-type semiconductor layer 114c is the first face and the lower surface of the reflective layer 111 in contact with the n-type semiconductor layer 112a is the second face. As described above, the photovoltaic layer 11 illustrated in FIG. 2 is made by stacking the photoelectric conversion layer 112 to the photoelectric conversion layer 114, and thereby can absorb the light of the wavelength in a wide range of the sunlight and efficiently utilize the energy of the sunlight. In this event, the photoelectric conversion layers are connected in series and therefore can obtain high voltage. Not limited to the above, a plurality of photoelectric conversion layers may be electrically connected in parallel. Further, a dual junction-type, a single layer-type photovoltaic layer may be used. An example of the photovoltaic layer having a stack composed of three photoelectric conversion layers has been explained in FIG. 2, but not limited to this, the photovoltaic layer may have a stack of two or four photoelectric conversion layers. Further, in place of the stack composed of the plurality of photoelectric conversion layers, one photoelectric conversion layer may be used. The foregoing is explanation of a structure example of the photovoltaic layer 11 illustrated in FIG. 2.

The oxidation electrode layer 12 illustrated in FIG. 1 is electrically connected to the first face of the photovoltaic layer 11. The oxidation electrode layer 12 has a function of causing an oxidation reaction of water. As a product to be produced by the oxidation reaction of water, for example, oxygen and the like can be exemplified. The oxidation electrode layer 12 contains an oxidation catalyst and a conductive material. The oxidation electrode layer 12 is composed of for example, a single layer containing the oxidation catalyst and the conductive material or a stack of a conductive layer and an oxidation catalyst layer. In the case of the stack of the conductive layer and the oxidation catalyst layer, the conductive layer may be in a plate shape. The oxidation catalyst layer may be, for example, in a thin-film shape, a lattice shape, a granular shape, or a wire shape.

Examples of the conductive material include materials containing at least one of Ag, Au, Al, and Cu, and an alloy material such as SUS. Not limited to them, but a light transmissive metal oxide such as ITO, ZnO, FTO, AZO, or ATO may be used as the conductive material. Further, the oxidation electrode layer 12 may be, for example, a stack composed of metal and a light transmissive metal oxide, a layer containing metal and another conductive material, or a layer containing a light transmissive metal oxide and another conductive material. Further, a conductive resin may be used as the conductive material. Furthermore, a semiconductor substrate containing silicon, germanium or the like or an ion exchange membrane may be used. Note that the oxidation electrode layer 12 is preferably a layer of a material capable of coming into ohmic contact with the p-type semiconductor layer 114c in the photovoltaic layer 11.

When light is irradiated to the photovoltaic layer 11 via the oxidation electrode layer 12, the oxidation electrode layer 12 needs to have a light transmitting property. In this case, the light transmittance of the oxidation electrode layer 12 is preferably, for example, at least 10% or more of an irradiation amount of the light irradiated to the oxidation electrode layer 12, and more preferably 30% or more thereof.

As the oxidation catalyst, a material that reduces activation energy for oxidizing water, in other words, a material that lowers an overvoltage when producing oxygen and hydrogen ions by the oxidation reaction of water can be exemplified. For example, iridium, platinum, cobalt, manganese catalysts and so on can be exemplified. Further, as the oxidation catalyst, a binary metal oxide, a ternary metal oxide, or a quaternary metal oxide can be used. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O) and so on. Examples of the ternary metal oxide include Ni—Co—O, La—Co—O, Ni—La—O, Sr—Fe—O and so on. Examples of the quaternary metal oxides include Pb—Ru—Ir—O, La—Sr—Co—O and so on. Note that not limited to them, but a metal complex such as a Ru complex or a Fe complex can be used as the oxidation catalyst. Further, a plurality of materials may be mixed.

The reduction electrode layer 13 is electrically connected to the second face of the photovoltaic layer 11. The reduction electrode layer 13 has a function of causing a reduction reaction of at least one of water and carbon dioxide.

The reduction electrode layer 13 contains a reduction catalyst and a conductive material. The reduction electrode layer 13 is composed of, for example, a single layer containing the reduction catalyst and the conductive material, or a stack of a conductive layer and a reduction catalyst layer. In the case of a stack of the conductive layer and the reduction catalyst layer, the reduction catalyst layer may be, for example, in a thin-film shape, a lattice shape, a granular shape, or a wire shape.

As product to be produced by the reduction reaction of at least one of water and carbon dioxide, at least one of hydrogen and a carbon compound can be exemplified. In this case, the carbon compound is different depending on the kind of the reduction catalyst. Examples of the carbon compound include carbon monoxide (CO), formic acid (HCOOH), methane ($CH_4$), methanol ($CH_3OH$), ethane ($C_2H_6$), ethylene ($C_2H_4$), ethanol ($C_2H_5OH$), and formaldehyde (HCHO) and so on.

Examples of the conductive material include materials containing at least one of Ag, Au, Al, and Cu. Not limited to them, but a light transmissive metal oxide such as ITO, ZnO, FTO, AZO, or ATO may be used as the conductive material. The reduction electrode layer 13 may be, for example, a stack composed of metal and a light transmissive metal oxide, a layer containing metal and another conductive material, or a layer containing a light transmissive metal oxide and another conductive material. Note that in the case where the photovoltaic layer 11 is not provided with the reflective layer 111, the reduction electrode layer 13 is preferably a layer of a material capable of coming into ohmic contact with the n-type semiconductor layer 112a in the photovoltaic layer 11.

As the reduction catalyst, a material that reduces activation energy for reducing carbon dioxide, in other words, a material that lowers an overvoltage when producing a product by the reduction reaction of carbon dioxide can be exemplified. For example, a metal material or a carbon material can be used. As the metal material, for example, Au, Ag, Cu, Pt, Ni, Zn, Pd or the like can be used. As the carbon material, for example, carbon, graphene, carbon nano tube (CNT), fullerene, or ketjen black can be used. Note that not limited to them, but a metal complex such as a Ru complex or a Re complex may be used as the reduction catalyst. Further, a plurality of materials may be mixed.

Note that, not limited to the configuration illustrated in FIG. 1, the photoelectrochemical reaction device may have such a configuration that the reduction electrode layer 13 is electrically connected to the first face of the photovoltaic layer 11 and the oxidation electrode layer 12 is electrically connected to the second face of the photovoltaic layer 11. In this case, the electrode layer on the side to which light is irradiated needs to have a light transmitting property.

In the case of a stack composed of a conductive layer and a catalyst layer, a protective layer may be provided between the conductive layer and the catalyst layer. Providing the protective layer makes it possible to prevent breakage of the photovoltaic layer 11 due to the oxidation and reduction reactions so as to increase the lifetime of the photoelectrochemical reaction device. As the protective layer, for example, ITO can be used. Further, as the protective layer, a dielectric such as $TiO_2$, $ZrO_2$, $Al_2O_3$, $SiO_2$, $HfO_2$ or the like may be used. In this case, setting the thickness of the protective layer to 10 nm or less, preferably 5 nm or less, provides electrical conductivity owing to the tunnel effect.

In the case where the oxidation electrode layer 12 and the reduction electrode layer 13 are each formed in a stack structure composed of the conductive layer and the catalyst layer, an oxidation reaction or a reduction reaction can be directly caused by the catalyst when charge separation is performed by the photovoltaic layer 11, so that the conversion efficiency from light to a chemical substance can be increased. Further, the structure that the oxidation electrode layer 12 or the reduction electrode layer 13 is in contact with the photovoltaic layer 11 eliminates the necessity to use wiring for connecting the photovoltaic layer 11 to the oxidation electrode layer 12 or the reduction electrode layer 13, thus simplifying the system. Further, it is possible to increase the electrode area. Note that the oxidation electrode layer 12 or the reduction electrode layer 13 may be formed at least at a part of the photovoltaic layer 11.

The electrolytic solution 14 is stored in a container such as an electrolytic solution tank. In the electrolytic solution 14, the photovoltaic layer 11, the oxidation electrode layer 12, and the reduction electrode layer 13 are immersed as illustrated in FIG. 1. Note that it is possible to replenish with the electrolytic solution 14 from an electrolytic solution flow path. Since little substance only needs to be supplied to a large area because of low energy by the sunlight, for example, a system in which modules each having an area of over 1 m$^2$ are coupled by the electrolytic solution flow path or a system in which at least an oxidation electrode layer and a reduction electrode layer are provided in the electrolytic solution flow path in a pipe shape, may be used. In this case, a heater and a temperature sensor may be provided at a part of the electrolytic solution flow path. Further, a vaporized electrolytic solution 14 component may be filled in the container.

The electrolytic solution 14 contains water ($H_2O$) and carbon dioxide ($CO_2$). The electrolytic solution 14 is preferably an aqueous solution that promotes the oxidation reaction of water. Examples of the electrolytic solution 14 include aqueous solutions containing phosphoric acid ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO^{3-}$) and so on. As the electrolytic solution 14, an aqueous solution containing $LiHCO_3$, $NaHCO_3$, $KHCO_3$, $CsHCO_3$ or the like can be used. The electrolytic solution 14 may contain alcohol such as methanol, ethanol, acetone or the like. Note that it is possible to change a generation ratio of products by changing the ratio of water contained in the electrolytic solution.

As the electrolytic solution 14, an electrolytic solution that absorbs carbon dioxide can be used. For example, an ionic liquid which is made of salts of cations such as imidazolium ions or pyridinium ions and anions such as $BF_4^-$ or $PF_6^-$ and which is in a liquid state in a wide temperature range, or its aqueous solution can be used. Other examples of the electrolytic solution that absorbs carbon dioxide are amine solutions of ethanolamine, imidazole, and pyridine, or aqueous solutions thereof. Examples of amine include primary amine, secondary amine, and tertiary amine.

Examples of the primary amine are methylamine, ethylamine, propylamine, butylamine, pentylamine, hexylamine, and the like. Hydrocarbons of the amine may be substituted by alcohol, halogen, or the like. Examples of the amine whose hydrocarbons are substituted are methanolamine, ethanolamine, chloromethyl amine, and so on. Further, an unsaturated bond may exist. These hydrocarbons are the same in the secondary amine and the tertiary amine.

Examples of the secondary amine are dimethylamine, diethylamine, dipropylamine, dibutylamine, dipentylamine, dihexylamine, dimethanolamine, diethanolamine, dipropanolamine, and so on. The substituted hydrocarbons may be different. This also applies to the tertiary amine. Examples in which the hydrocarbons are different are methylethylamine, methylpropylamine, and so on.

Examples of the tertiary amine are trimethylamine, triethylamine, tripropylamine, tributylamine, trihexylamine, trimethanolamine, triethanolamine, tripropanolamine, tributanolamine, tripropanolamine, triexanolamine, methyldiethylamine, methyldipropylamine, and so on.

Examples of the cations of the ionic liquid are 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on.

Note that a second place of imidazolium ions may be substituted. Examples in which the second place of the imidazolium ions is substituted are 1-ethyl-2,3-dimethylimidazolium ions, 1-2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on.

Examples of pyridinium ions are methylpyridinium, ethylpyridinium, propylpyridinium, butylpyridinium, pentylpyridinium, hexylpyridinium, and so on. In both of the imidazolium ions and the pyridinium ions, an alkyl group may be substituted, or an unsaturated bond may exist.

Examples of the anions are fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxy sulfonyl)imide, bis(trifluoromethoxysulfonyl)imide, bis(perfluoroethylsulfonyl)imide, and so on. Dipolar ions in which the cations and the anions of the ionic liquid are coupled by hydrocarbons may be used.

Note that an electrolytic solution 14a and an electrolytic solution 14b may be provided as the electrolytic solution 14 as illustrated in FIG. 1. The electrolytic solution 14a contains water ($H_2O$) and the electrolytic solution 14b contains at least one of water ($H_2O$) and carbon dioxide ($CO_2$). In this case, the electrolytic solution 14a is supplied to the oxidation electrode layer 12, and the electrolytic solution 14b is supplied to the reduction electrode layer 13. The electrolytic solution 14a and the electrolytic solution 14b may be supplied from separate flow paths. As the electrolytic solution 14a, an electrolytic solution containing water among electrolytic solutions applicable to the electrolytic solution 14 can be used. As the electrolytic solution 14b, an electrolytic solution containing (or absorbing) at least one of water and carbon dioxide among electrolytic solutions applicable to the electrolytic solution 14 can be used. Note that the electrolytic solution 14a and the electrolytic solution 14b may be the same electrolytic solution. In this case, the electrolytic solution 14a and the electrolytic solution 14b may be recognized as one electrolytic solution 14.

The ion exchange membrane 15 has a function of allowing permeation of at least one kind of ion contained in the electrolytic solution 14, between the oxidation electrode layer 12 and the reduction electrode layer 13. Examples of the ion exchange membrane 15 include cation exchange membranes such as Nafion (registered trademark) and Flemion (registered trademark) and anion exchange membranes such as Neosepta (registered trademark) and Selemion (registered trademark). Further, the ion exchange membrane 15 may be provided with ion permeation holes and glass filter or agar may be filled in the ion permeation holes. Note that in the case where the same electrolytic solution component reacts in the oxidation electrode layer 12 and the reduction electrode layer 13, the case where different electrolytic solution components react and the like, the ion exchange membrane 15 does not have to be provided.

The porous layer 16 is in contact with at least the electrolytic solution 14 (that may be the electrolytic solution 14a or the electrolytic solution 14b). The porous layer 16 has fine pores through which the product produced by the oxidation reaction or the reduction reaction pass. The porous layer 16 is given a temperature gradient and thereby has a function of refining a product by repeatedly performing vaporization and liquefaction of at least a part of the product while moving the product from a high temperature side to a low temperature side through the fine pores.

For example, when the product contains hydrogen or oxygen, the porous layer 16 repeatedly performs vaporization and liquefaction of at least a part of the product while moving the product from a high temperature side to a low temperature side through the fine pores to remove impurities such as moisture in the product to thereby extract hydrogen or oxygen. For example, by repeatedly performing vaporization and liquefaction of moisture contained in the product, the moisture is removed. Further, when the product contains a carbon compound, the porous layer 16 repeatedly performs vaporization and liquefaction of at least a part of the product while moving the product from a high temperature side to a low temperature side through the fine pores to rectify the carbon compound. Note that both the extraction of hydrogen or oxygen and the rectification of the carbon compound may be performed.

As the porous layer 16, for example, a hydrophobic porous body can be exemplified. For example, the porous layer 16 may contain a glass material or a resin material. As the glass material, for example, porous glass can be used. For example, porous glass having a water repellent polymer layer such as fluorine may be used on its surface. As the resin material, porous polytetrafluoroethylene, porous fluorine-based resin or the like in a film shape or a plate shape can be used. Further, the porous layer 16 is adjusted, for example, in diameter of the fine pores and thereby adjusted in surface tension and thereby can control the passage rate of liquid or gas. Further, the porous layer 16 may have a light transmitting property.

A smaller diameter of the fine pore of the porous layer 16 is better in consideration of the efficiency of a distillation step and downsizing. The porous layer 16 preferably has a structure in which a plurality of fine pores are coupled to allow gas to pass, and, for example, 3 to 4 fine pores are preferably coupled. The thickness of the porous layer 16 is preferably, for example, 0.2 mm to 0.3 mm or more. When 3 to 4 fine pores are coupled in the porous layer 16 of 0.2 mm to 0.3 mm, the diameter of the fine pore is preferably 0.1 mm or less. When the thickness of the porous layer 16 is 2 mm to 3 mm, the diameter of the fine pore may be 0.5 mm or less.

The product flow path 17 is in contact with the porous layer 16. The product flow path 17 is a product recovery flow path provided for recovering the refined product. By providing the product flow path 17, the product such as hydrogen, a carbon compound or the like can be taken out of the photoelectrochemical reaction device 10 to the outside.

Figure 3:
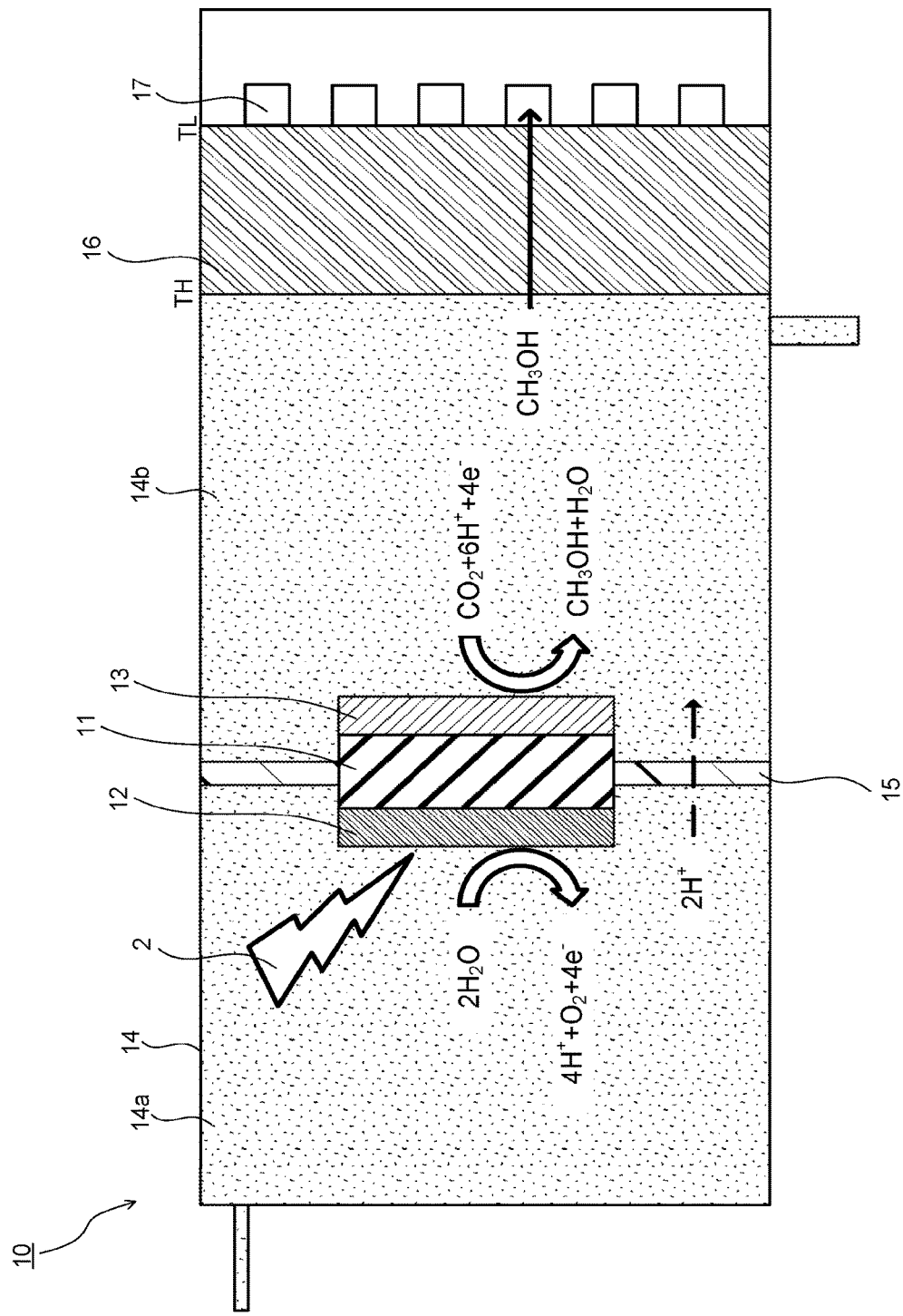
FIG. 3 is a schematic view illustrating an operation example of the photoelectrochemical reaction device.

Next, an operation example of the photoelectrochemical reaction device illustrated in FIG. 1 will be described. Here, the case of producing methanol will be described as an example. FIG. 3 is a schematic view for explaining the operation example of the photoelectrochemical reaction device 10. As illustrated in FIG. 3, light 2 is incident on the photovoltaic layer 11 via the oxidation electrode layer 12. The light 2 is preferably the sunlight but, not limited to this, may be, for example, light of a light emitting diode, an organic EL or the like. When the light 2 is incident, the photovoltaic layer 11 absorbs the light 2 and generates and separates photoexcited electrons and holes. In this event, the holes gather on the oxidation electrode layer 12 side and the photoexcited electrons gather on the reduction electrode layer 13 side. This causes electromotive force in the photovoltaic layer 11.

When the holes gather in the oxidation electrode layer 12, the oxidation reaction of water occurs as in the following formula (1) to produce oxygen and hydrogen ions.

$$2H_2O \rightarrow 4H^+ + O_2 + 4e^- \quad (1)$$

The hydrogen ions produced by the oxidation reaction permeate the ion exchange membrane 15 and migrate to the reduction electrode layer 13 side.

When the photoexcited electrons gather in the reduction electrode layer 13, the reduction reaction of carbon dioxide occurs as in the following formula (2), and carbon dioxide and hydrogen ions react to produce methanol being a carbon compound and water. Methanol dissolves in the electrolytic solution 14 at an arbitrary ratio. Further, hydrogen may be produced in this event.

$$CO_2 + 6H^+ + 4e^- \rightarrow CH_3OH + H_2O \quad (2)$$

In this event, the photovoltaic layer 11 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V], and the standard oxidation-reduction potential of the reduction reaction in the formula (2) is −0.03 [V]. Therefore, the open-circuit voltage of the photovoltaic layer 11 needs to be 1.26 [V] or more. Further, the open-circuit voltage of the photovoltaic layer 11 is preferably equal to or more than the potential difference including overvoltages. For example, when the overvoltages of the oxidation reaction in the formula (1) and the reduction reaction in the formula (2) are both 0.2 [V], the open-circuit voltage is preferably 1.66 [V] or more.

Figure 4:
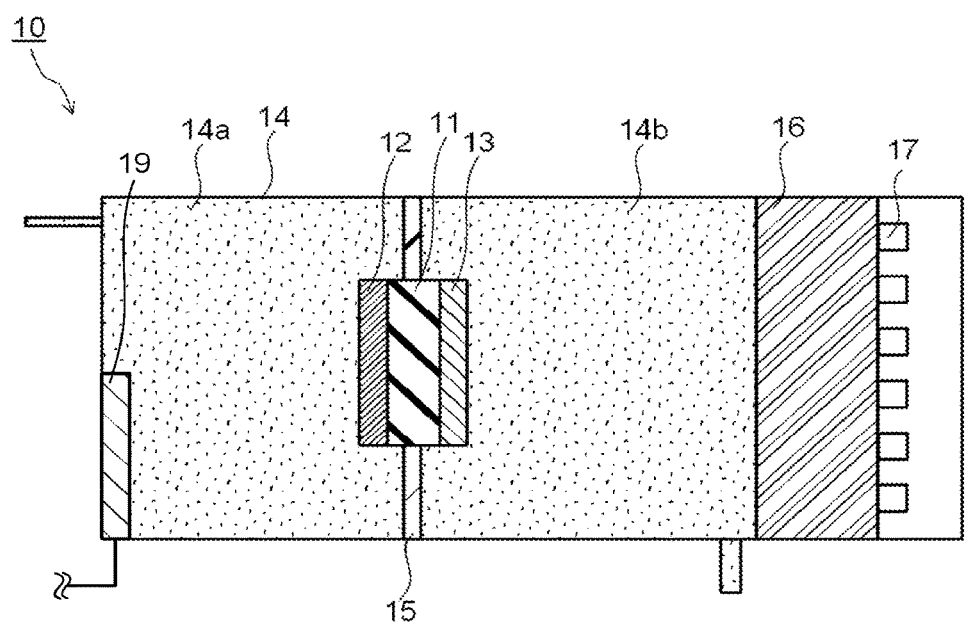
FIG. 4 is a schematic view illustrating a configuration example of the photoelectrochemical reaction device in a first embodiment.

Further, the porous layer 16 is given a temperature gradient in which its portion near a contact surface with the electrolytic solution 14 is set to a high temperature TH and its portion near a contact surface with the product flow path 17 is set to a low temperature TL, whereby the produced methanol moves from the temperature TH side to the temperature TL side while passing through the fine pores of the porous layer 16. The temperature gradient is preferably provided in a range of, for example, 65 degrees centigrade to 80 degrees centigrade, and the temperature TH is, for example, 70 degrees centigrade or higher, and the temperature TL is, for example, 65 degrees centigrade or lower. The temperature gradient may be formed, for example, by heating the electrolytic solution 14 with the irradiated light 2. In this event, the light may be condensed to the photovoltaic layer 11 using a reflection member such as a mirror. Alternatively, the electrolytic solution 14 is heated by providing a heater in the container in which the electrolytic solution 14 is stored. Alternatively, as illustrated in FIG. 4, a new electrode layer 19 may be provided and heated by a reaction between other electrode layers so that the electrode layer 19 heats the electrolytic solution 14 to form the temperature gradient. In this event, the electrode layer 19 may be electrically connected to an external circuit via a wiring or the like. In FIG. 4, the electrode layer 19 is illustrated to be immersed in the region 14a, but is not limited to this.

In the case where the electrolytic solution 14 or the like is stored in the container, the temperature gradient may be given to the porous layer 16 using heat applied to the container. In this event, the temperature may be estimated from a thermometer such as a thermocouple, a kinetic current in the oxidation and reduction reactions, and the produced gas volume in the oxidation electrode layer, in order to perform temperature management. Further, provision of the new electrode layer 19 as described above in addition to the configuration in FIG. 1 makes it also possible to recognize electrolytic solution concentration, pH, and temperature through the reaction between other electrode layers, and the device can be simplified by commonalizing them.

The produced methanol, when vaporized, gathers to the fine pores in the porous layer 16. The ratio of methanol to be vaporized is decided by a ratio of concentration of methanol. Further, when the vaporized methanol is liquefied again in the fine pores, methanol is rectified.

For example, in the relationship between the ratio of concentration and the boiling point of methanol, when the temperature of methanol exceeds a liquid phase line, methanol starts to vaporize, whereas when the temperature exceeds a vapor phase line, methanol is completely vaporized. For example, methanol of a concentration of 28% starts to vaporize at a temperature of over 78 degrees centigrade. In this event, the vaporized methanol is condensed and thus has a concentration of 68%. Thereafter, the methanol of a concentration of 68% is liquefied again at a temperature lower than 70 degrees centigrade by the fine pores of the porous layer 16.

Further, the liquefied methanol of a concentration of 68% starts to vaporize again at a temperature of over 70 degrees centigrade. In this event, the vaporized methanol is condensed and thus has a concentration of 85%. Thereafter, the methanol of a concentration of 85% is liquefied again at a temperature lower than 66 degrees centigrade.

As described above, the methanol obtained by repeatedly performing vaporization and liquefaction as described above is recovered through the product flow path 17. The recovered methanol is liquefied into methanol that is condensed more than the methanol produced by the reduction reaction. The carbon compound such as the methanol is easy to store and transport. Note that for liquefaction at the recovery time, a heat radiating member or the like may be provided in the porous layer 16, the product flow path 17 or the like. Note that making the pressure applied to the electrolytic solution 14 higher than the pressure applied to the product flow path 17 makes it possible to efficiently collect the product to the product flow path 17. Further, providing a cooling member in the product flow path 17 makes it possible to facilitate liquefaction of at least a part of the product.

As described above, in the photoelectrochemical reaction device illustrated in FIG. 1, purification of the product such as the carbon compound by the porous layer makes it possible to reduce the amount of impurities such as water vapor, thus facilitating the separation of water and the product and reducing or eliminating the dehydration treatment. Accordingly, the energy when separating water and the product can be reduced. A reduction in separation energy enables suppression in unnecessary consumption of light energy of the sunlight or the like, resulting in increased conversion efficiency.

In the photoelectrochemical reaction device illustrated in FIG. 1, purification such as rectification in the lateral direction becomes possible as in a distillation apparatus such as a commercially-available Kugelrohr. Further, the photoelectrochemical reaction device in this embodiment can be made smaller in device size than that of Kugelrohr or the like, and thus can perform purification with high volume density.

Even if the carbon compound is gas such as carbon monoxide, methane, ethane, ethylene, the amount of water vapor contained in the carbon compound can be reduced by recovering the carbon compound via the porous layer 16. Accordingly, the energy density of the obtained carbon compound can be improved. Further, a smaller amount of water vapor is more preferable when thereafter causing the carbon compound to react with another substance or also when compressing and liquefying the produced gas.

Note that the photoelectrochemical reaction device in this embodiment is not limited to the configuration illustrated in FIG. 1. Other configuration examples of the photoelectrochemical reaction device in this embodiment will be described referring to FIG. 5 to FIG. 8. FIG. 5 to FIG. 8 are schematic views illustrating other configuration examples of the photoelectrochemical reaction device in a first embodiment. Note that for the photoelectrochemical reaction devices illustrated in FIG. 5 to FIG. 8, the same parts as in the photoelectrochemical reaction device illustrated in FIG. 1, the description of FIG. 1 can be appropriately employed.

Figure 5:
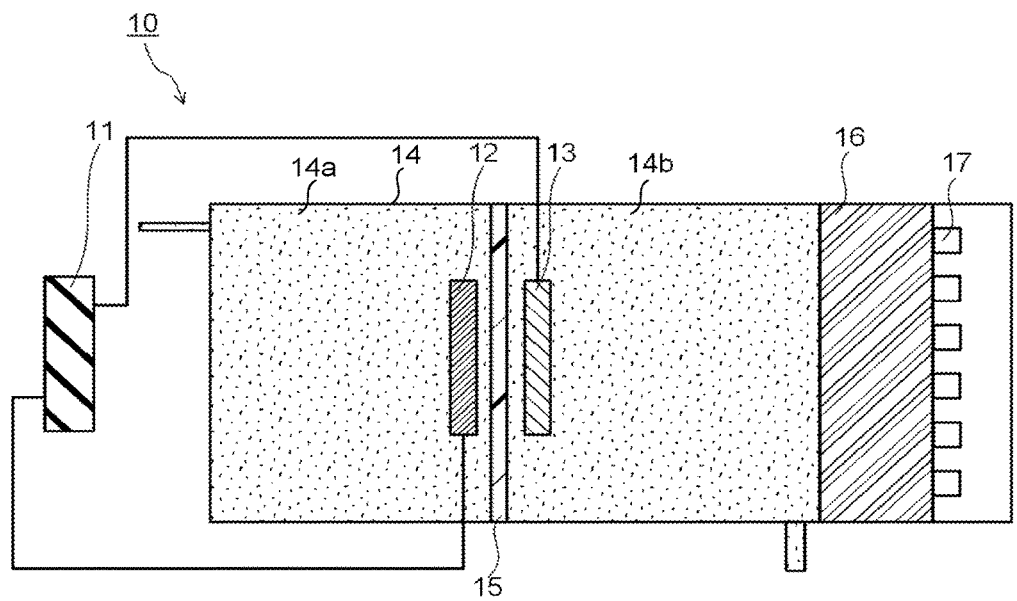
FIG. 5 is a schematic view illustrating a configuration example of the photoelectrochemical reaction device in the first embodiment.

The photoelectrochemical reaction device 10 illustrated in FIG. 5 is different at least in that the photovoltaic layer 11 is provided to be separated from the electrolytic solution 14 as compared with the photoelectrochemical reaction device 10 illustrated in FIG. 1. The photovoltaic layer 11 is electrically connected to the oxidation electrode layer 12 and the reduction electrode layer 13 via electric wires or the like. By providing the photovoltaic layer 11 to be separated from the electrolytic solution 14, deterioration of the photovoltaic layer 11 by the electrolytic solution 14 can be suppressed. In the case of providing the photovoltaic layer 11 to be separated from the electrolytic solution 14, the photovoltaic layer 11 is preferably connected to the oxidation electrode layer 12 or the reduction electrode layer 13 via a heat transfer member. This makes it possible to transfer heat, which is generated when light is incident on the photovoltaic layer 11, to the oxidation electrode layer 12 or the reduction electrode layer 13. Further, heat may be directly transferred from the photovoltaic layer 11 to the electrolytic solution 14 via the heat transfer member. Furthermore, a heat transfer member may also be provided between the electrolytic solution 14 and the porous layer 16 and between the porous layer 16 and the product flow path 17.

Figure 6:
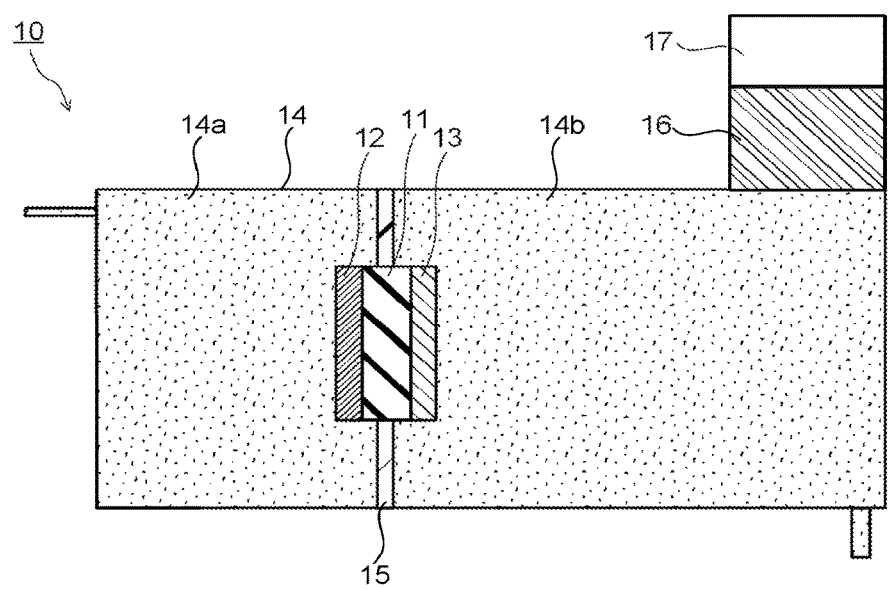
FIG. 6 is a schematic view illustrating a configuration example of the photoelectrochemical reaction device in the first embodiment.

The photoelectrochemical reaction device 10 illustrated in FIG. 6 is different at least in that the porous layer 16 is provided on the electrolytic solution 14 (the electrolytic solution 14a or the electrolytic solution 14b) and the product flow path 17 is provided on the porous layer 16 as compared with the photoelectrochemical reaction device 10 illustrated in FIG. 1. Since the vaporized product is likely to move upward, providing the porous layer 16 on the electrolytic solution 14 makes it possible to efficiently perform purification of the vaporized product utilizing gravity.

Figure 7:
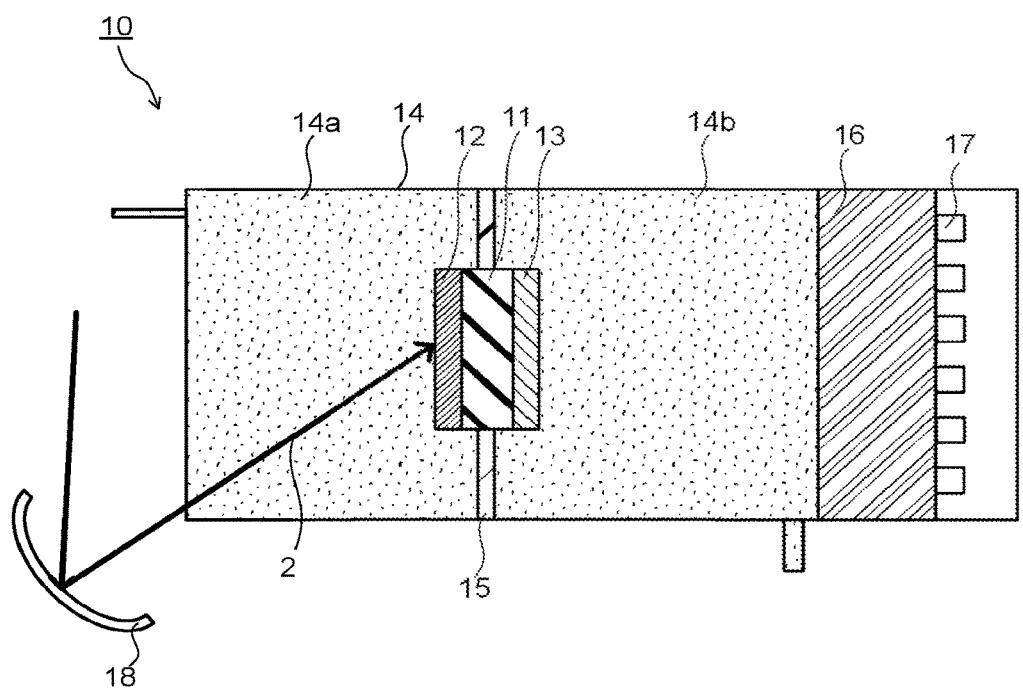
FIG. 7 is a schematic view illustrating a configuration example of the photoelectrochemical reaction device in the first embodiment.

The photoelectrochemical reaction device 10 illustrated in FIG. 7 includes a reflection member 18 in addition to the components of the photoelectrochemical reaction device 10 illustrated in FIG. 1. The reflection member 18 has a function of condensing light to the photovoltaic layer 11. As the reflection member 18, a member having light reflectivity such as a mirror can be used. By providing the reflection member 18, the amount of light to be irradiated to the photovoltaic layer 11 can be increased to increase the charge separation amount by the photovoltaic layer 11. Further, the heat energy to be supplied to the electrolytic solution 14, the porous layer 16 and so on can also be increased, and separation of the product by heat can be rapidly performed. Furthermore, secondarily using a heater or the like to perform temperature management leads to further energy saving. The heat of the reflection member 18 warmed with light may be transferred to the oxidation electrode layer 12, the reduction electrode layer 13, the electrolytic solution 14, the porous layer 16, the product flow path 17 and so on by a heat transfer member.

Figure 8:
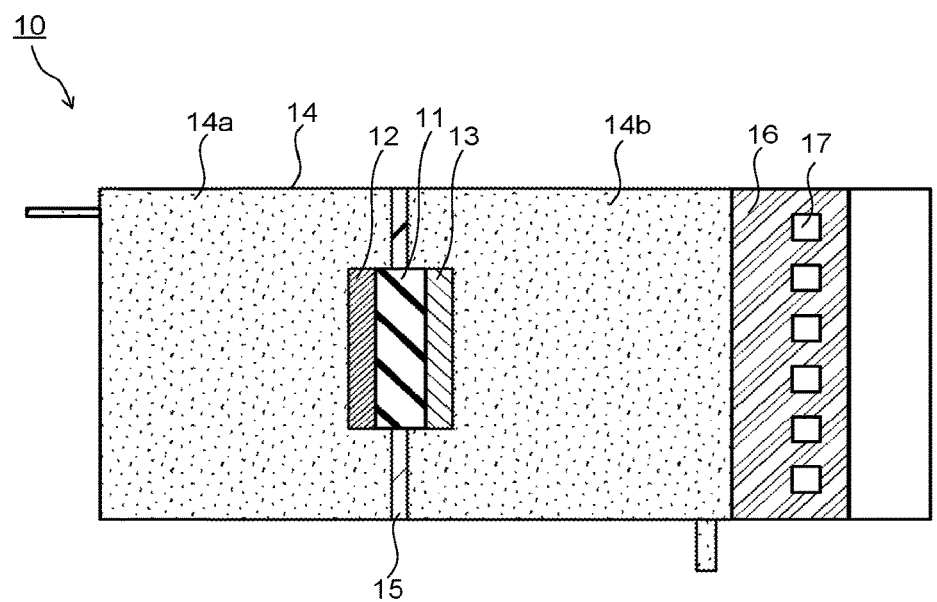
FIG. 8 is a schematic view illustrating a configuration example of the photoelectrochemical reaction device in the first embodiment.

The photoelectrochemical reaction device 10 illustrated in FIG. 8 is different at least in that the product flow path 17 is provided to be surrounded by the porous layer 16 as compared with the photoelectrochemical reaction device 10 illustrated in FIG. 1. In this event, the produced product can be efficiently recovered by keeping the pressure inside the product flow path 17 lower than the pressure to be applied to the electrolytic solution 14. Further, it is preferable that the porous layer 16 and the product flow path 17 are integrated together to reduce members.

Note that parts of the photoelectrochemical reaction devices 10 illustrated in FIG. 1, FIG. 4 to FIG. 8 can be appropriately exchanged with each other. Further, at least parts of the photoelectrochemical reaction devices 10 illustrated in FIG. 1, FIG. 4 to FIG. 8 can be appropriately combined together.

Second Embodiment

Figure 9:
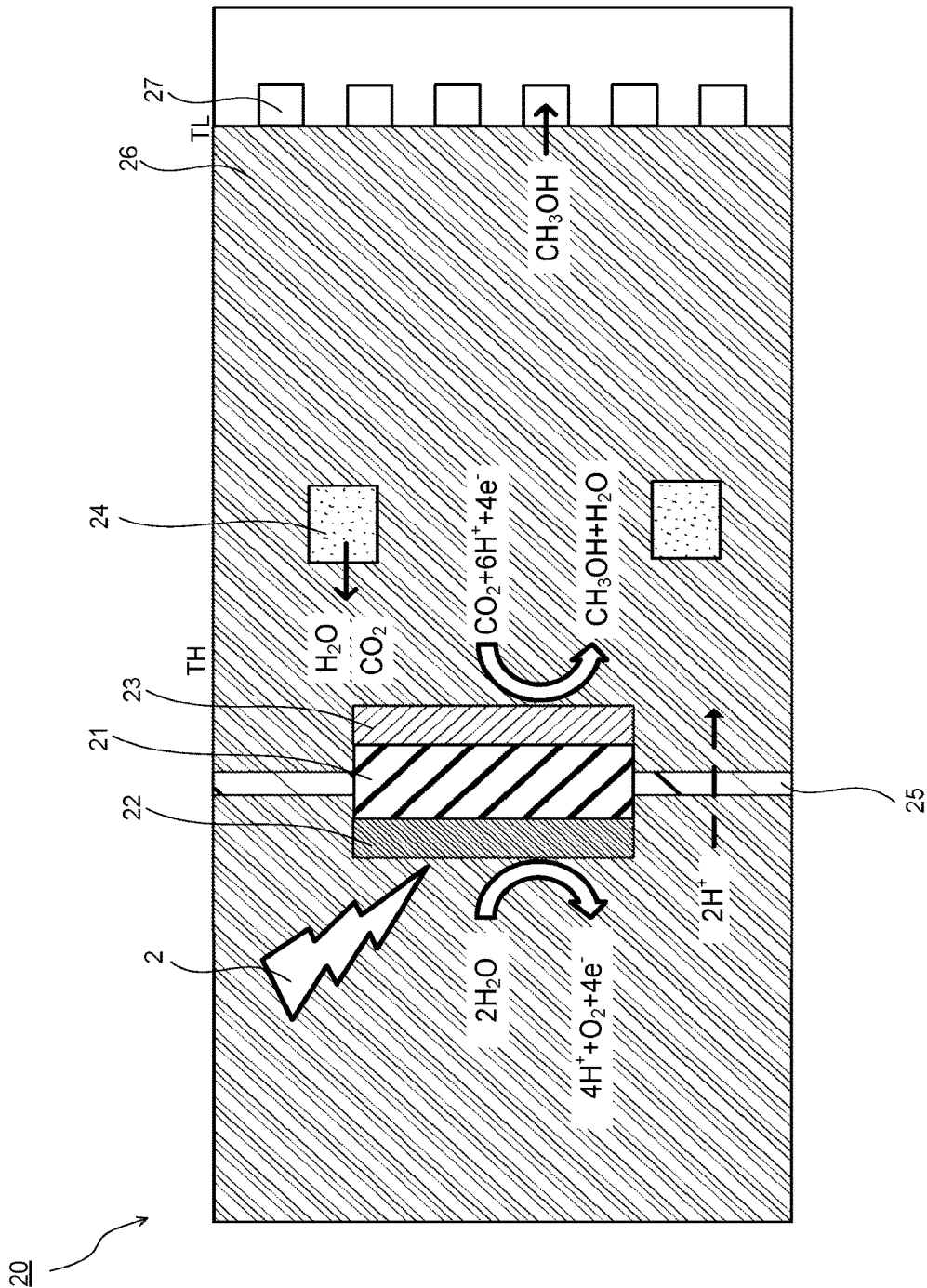
FIG. 9 is a schematic view illustrating a configuration example and an operation example of a photoelectrochemical reaction device in a second embodiment.

FIG. 9 is a schematic view illustrating a configuration example and an operation example of a photoelectrochemical reaction device. A photoelectrochemical reaction device 20 illustrated in FIG. 9 includes a photovoltaic layer 21, an oxidation electrode layer 22, a reduction electrode layer 23, an electrolytic solution 24, an ion exchange membrane 25, a porous layer 26, and a product flow path 27.

As the photovoltaic layer 21, a layer applicable to the photovoltaic layer 11 can be used. In addition, the description of the photovoltaic layer 11 can be appropriately employed for the description of the photovoltaic layer 21.

The oxidation electrode layer 22 is electrically connected to a first face of the photovoltaic layer 21, and the reduction electrode layer 23 is electrically connected to a second face of the photovoltaic layer 21. As the oxidation electrode layer 22, a layer of a material applicable to the oxidation electrode layer 12 can be used. As the reduction electrode layer 23, a layer of a material applicable to the reduction electrode layer 13 can be used. In addition, the description of the oxidation electrode layer 12 and the reduction electrode layer 13 can be appropriately employed for the description of the oxidation electrode layer 22 and the reduction electrode layer 23.

The electrolytic solution 24 is provided to be separated from both of the oxidation electrode layer 22 and the reduction electrode layer 23. The electrolytic solution 24 is supplied, for example, from an electrolytic solution flow path. As the electrolytic solution 24, an electrolytic solution of a material applicable to the electrolytic solution 14 can be used. In this case, the electrolytic solution 24 is preferably provided at a position closer to the oxidation electrode layer 22 and the reduction electrode layer 23 than is the product flow path 27. Note that a first electrolytic solution and a second electrolytic solution may be provided correspondingly to the oxidation electrode layer 22 and the reduction electrode layer 23 respectively as in the first embodiment. In addition, the description of the electrolytic solution 14 can be appropriately employed for the description of the electrolytic solution 24.

As the ion exchange membrane 25, a membrane of a material applicable to the ion exchange membrane 15 can be used. The ion exchange membrane 25 has a function of allowing permeation of at least one kind of ion between the oxidation electrode layer 22 and the reduction electrode layer 23. In addition, the description of the ion exchange membrane 15 can be appropriately employed for the description of the ion exchange membrane 25.

The porous layer 26 is provided to be in contact with the oxidation electrode layer 22, the reduction electrode layer 23, and the electrolytic solution 24. Further, the porous layer 26 has fine pores through which the electrolytic solution 24 passes. Note that the product produced by the oxidation reaction or the reduction reaction may be allowed to pass through the fine pores. This enables liquid or gas to move among the oxidation electrode layer 22, the reduction electrode layer 23, and the electrolytic solution 24 via the porous layer 26. The porous layer 26 is given a temperature gradient and thereby has a function of purifying the product produced by the oxidation reaction or the reduction reaction and a function of supplying the electrolytic solution 24 to the oxidation electrode layer 22 or the reduction electrode layer 23 via the fine pores while vaporizing it. In this case, the porous layer 26 does not have to have the function of purifying the product produced by the oxidation reaction or the reduction reaction by being given the temperature gradient. Further, in the case of providing the first electrolytic solution and the second electrolytic solution as the electrolytic solution 24 as in the first embodiment, the porous layer 26 supplies the first electrolytic solution or the second electrolytic solution to the oxidation electrode layer 22 or the reduction electrode layer 23 via the fine pores while vaporizing them.

As the porous layer 26, a layer of a material applicable to the porous layer 16 can be used. In this case, the porous layer 26 preferably has a light transmitting property to allow light to be incident on the photovoltaic layer 21 via at least one of the oxidation electrode layer 22 and the reduction electrode layer 23. Note that an opening may be provided in the porous layer 26 to expose at least a part of the oxidation electrode layer 22 in FIG. 9 This can enhance the incident efficiency of the light on the photovoltaic layer 21. In addition, the description of the porous layer 16 can be appropriately employed for the description of the porous layer 26. In the case where the oxidation electrode layer 22 or the reduction electrode layer 23 is in contact with the porous layer 26 as in FIG. 9, a conductive material such as carbon may be used as the porous layer 26. Examples of the carbon material include porous body such as ketjen black. As the conductive material, a water repellent resin or the like applicable to the above-described porous layer 16 may be used. The porous layer 26 is made water repellent to cause the moisture in the electrolytic solution 24 to exist in a gaseous state in the porous layer 26, so that the reaction proceeds more rapidly because of improvement in diffusion of substance. Using a catalyst material applicable to the oxidation electrode layer 22 or the reduction electrode layer 23 as the material also makes it possible to cause the reaction to proceed in the whole porous layer 26. The porous layer 26 may be in a multilayer structure for causing the reaction to efficiently proceed by those properties, and it is conceivable to provide porous bodies different in properties such as pore size and density, water repellency, and addition of a catalyst material, in layers, for example, around the electrolytic solution 24, around the electrodes such as the oxidation electrode layer 22 and the reduction electrode layer 23, and around the product flow path 27.

The product flow path 27 is in contact with the porous layer 26. The product flow path 27 is a product recovery flow path having a function of recovering the refined product. By providing the product flow path 27, the product such as hydrogen, a carbon compound or the like from the photoelectrochemical reaction device 20 to the outside. The product flow path 27 is preferably separated from the photovoltaic layer 21. Further, the product flow path 27 may be cooled by a fin or a cooling member. In addition, the description of the product flow path 17 can be appropriately employed for the description of the product flow path 27.

Next, an operation example of the photoelectrochemical reaction device illustrated in FIG. 9 will be described. Here, the case of producing methanol will be described as an example. In the photoelectrochemical reaction device 20 illustrated in FIG. 9, the porous layer 26 is given a temperature gradient in which its portion near the reduction electrode layer 23 is set to a high temperature TH and its portion near the product flow path 27 is set to a low temperature TL by the method similar to that in the first embodiment to vaporize the electrolytic solution 24, whereby water vapor and carbon dioxide contained in the electrolytic solution 24 diffuse to a contact surface with the oxidation electrode layer 22 and a contact surface with the reduction electrode layer 23.

Further, when light 2 is incident on the photovoltaic layer 21 via the oxidation electrode layer 22, the photovoltaic layer 21 absorbs the light 2 and generates photoexcited electrons and holes to thereby perform charge separation. In this event, the holes gather on the oxidation electrode layer 22 side and the photoexcited electrons gather on the reduction electrode layer 23 side. This causes electromotive force in the photovoltaic layer 21. In the case of adding the electrical conductivity to the porous layer 26 to thereby add the catalyst function as described above, the reaction proceeds also in the whole porous layer 26.

When the holes gather in the oxidation electrode layer 22, the oxidation reaction of water occurs as in the above formula (1) to produce oxygen and hydrogen ions. The hydrogen ions produced by the oxidation reaction permeate the ion exchange membrane 25 and migrate to the reduction electrode layer 23 side.

When the photoexcited electrons gather in the reduction electrode layer 23, the reduction reaction of carbon dioxide occurs as in the above formula (2), and carbon dioxide and hydrogen ions react to produce methanol being a carbon compound and water. Further, the produced methanol moves from the electrolytic solution 24 to the porous layer 26. The porous layer 26 repeatedly performs vaporization and liquefaction of methanol by the above-described temperature gradient to rectify the methanol.

The ratio of methanol to be vaporized is decided by a ratio of concentration of methanol. Further, the recovered methanol becomes methanol condensed more than the methanol produced by the reduction reaction. As described above, also the photoelectrochemical reaction device illustrated in FIG. 9 can refine the product with a high conversion efficiency. Further, generation of carbon monoxide enables reduction of moisture such as water vapor. Also in the case of increasing the volume density by compressing or liquefying the produced gas, the product containing no water vapor is more preferable and desirable for use thereafter, and therefore existence of the porous layer 26 is applied not only to the liquid component such as methanol to be mixed with water. Further, vaporizing and supplying the electrolytic solution 24 to the oxidation electrode layer 22 or the reduction electrode layer 23 increases the efficiency of the oxidation reaction or the reduction reaction by the catalyst as compared with a liquid electrolytic solution, and can increase the purity of the product because of less impurities such as moisture.

Note that the photoelectrochemical reaction device in this embodiment is not limited to the configuration illustrated in FIG. 9. Other examples of the photoelectrochemical reaction device in this embodiment will be described below referring to FIG. 10 to FIG. 15. FIG. 10 to FIG. 15 are schematic views illustrating the other examples of the photoelectrochemical reaction device. Note that for the same parts as those in the photoelectrochemical reaction device illustrated in FIG. 9, the description of FIG. 9 can be appropriately employed.

Figure 10:
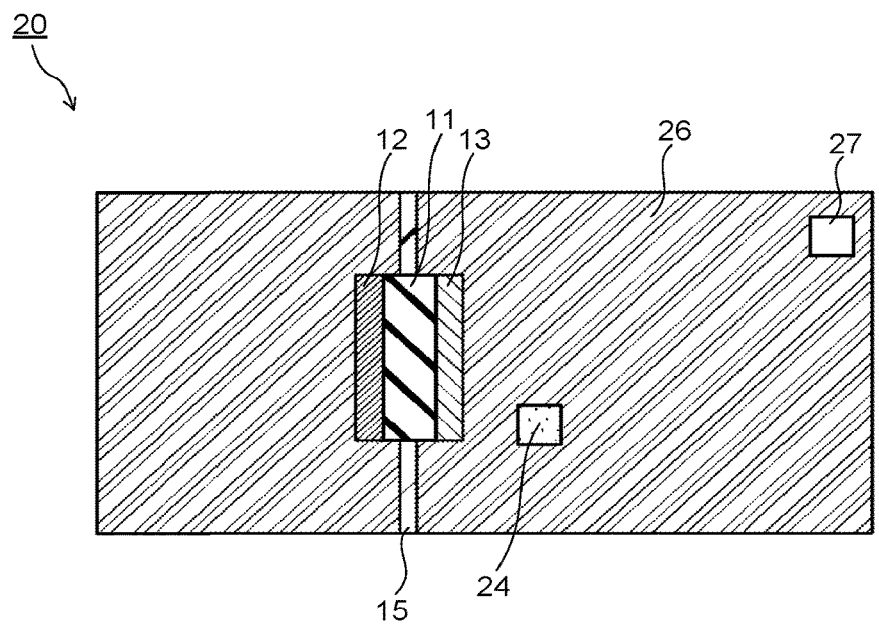
FIG. 10 is a schematic view illustrating a configuration example of the photoelectrochemical reaction device in the second embodiment.
Figure 11:
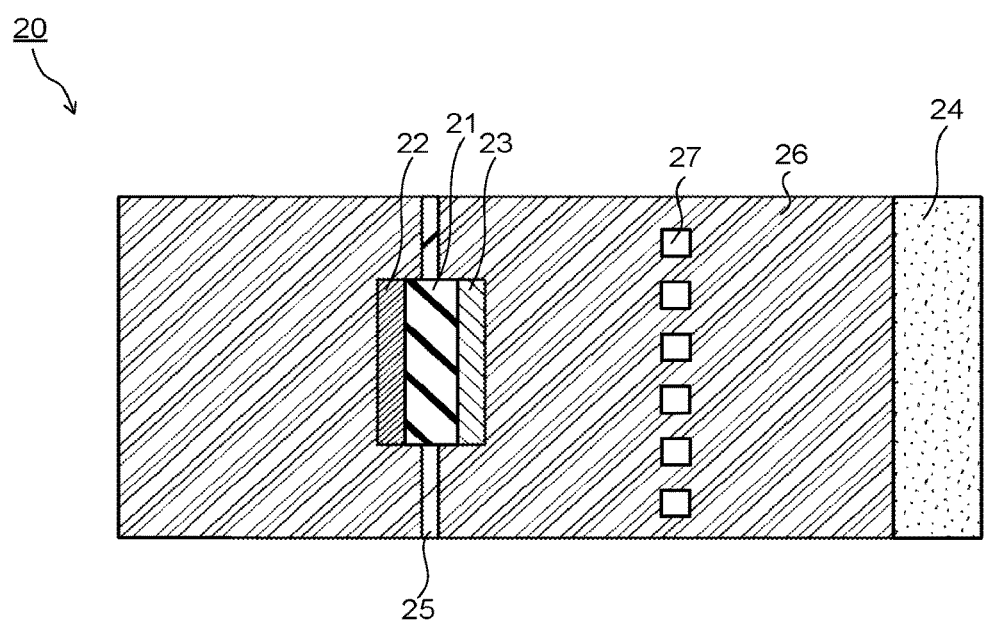
FIG. 11 is a schematic view illustrating a configuration example of the photoelectrochemical reaction device in the second embodiment.

The photoelectrochemical reaction device 20 illustrated in FIG. 10 is different at least in that the product flow path 27 surrounded by the porous layer 26 is provided as compared with the photoelectrochemical reaction device 20 illustrated in FIG. 9. The photoelectrochemical reaction device 20 illustrated in FIG. 11 is different at least in that the product flow path 27 surrounded by the porous layer 26 is provided and the porous layer 26 is provided which is in contact with the electrolytic solution 24 stored in the container as compared with the photoelectrochemical reaction device 20 illustrated in FIG. 9. Providing the product flow path 27 to be surrounded by the porous layer 26 makes it possible to recover the product to be produced by the reduction reaction while suppressing leakage of the product. Further, integration of the porous layer 26 and the product flow path 27 together to reduce the number of parts is preferable in terms of manufacturability and cost. Further, there are a plurality of products, a plurality of product flow paths 27 may be provided, for instance, may be provided at positions different in temperature so as to separate the products depending on temperature. Further, the recovery is not limited to recovery of products by kind but is conceivable to be recovery of products by use such as recovery of products by component different in moisture amount.

Figure 12:
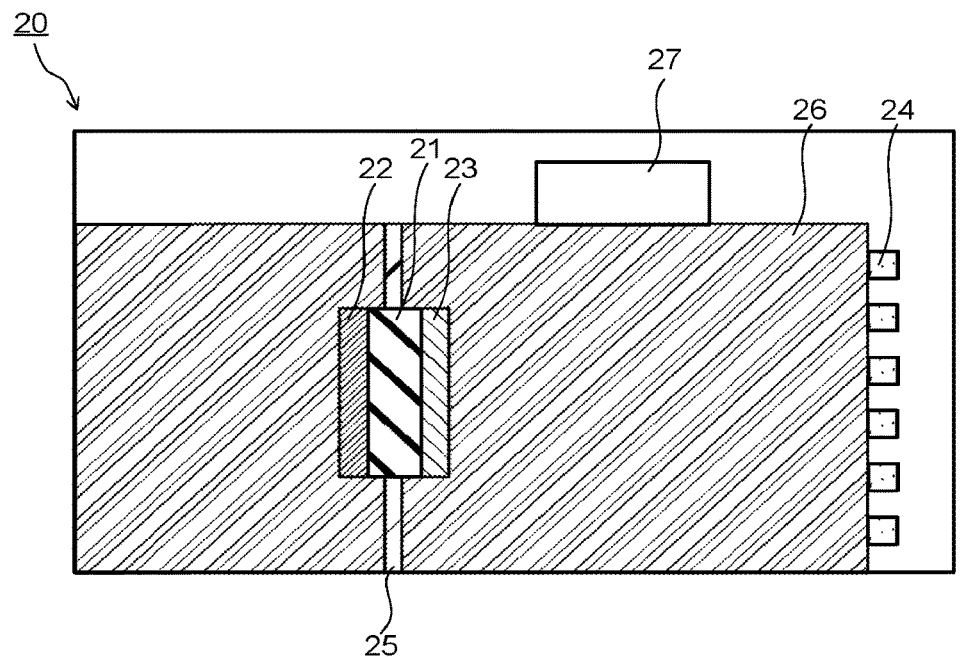
FIG. 12 is a schematic view illustrating a configuration example of the photoelectrochemical reaction device in the second embodiment.
Figure 13:
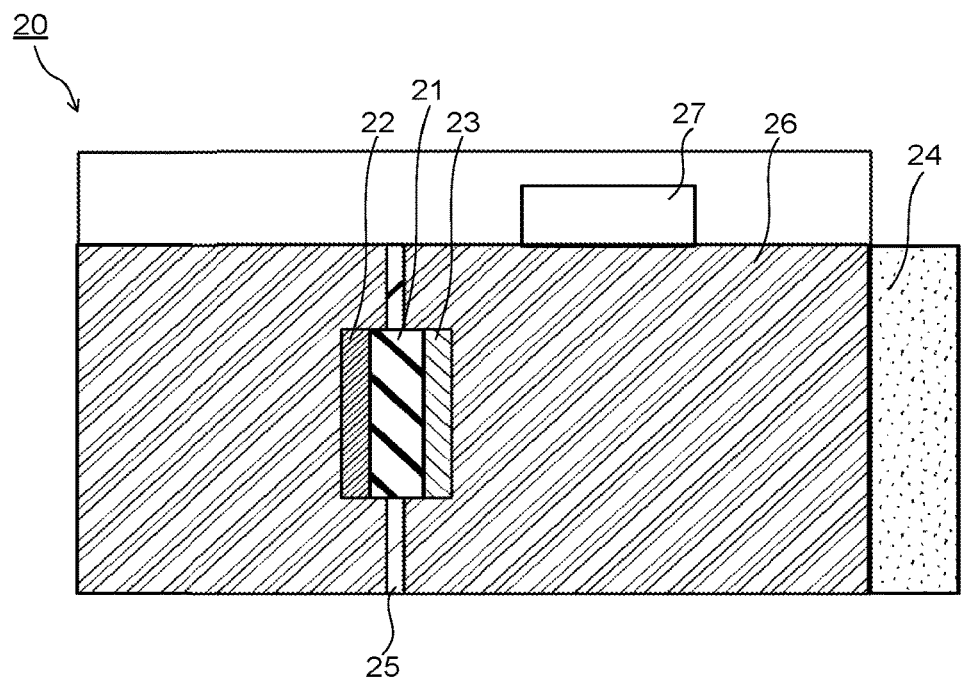
FIG. 13 is a schematic view illustrating a configuration example of the photoelectrochemical reaction device in the second embodiment.

The photoelectrochemical reaction device 20 illustrated in FIG. 12 is different at least in that that the product flow path 27 is provided on the porous layer 26 and the electrolytic solution 24 is provided which is in contact with the porous layer 26 and supplied from a electrolytic solution flow path different from the product flow path 27 as compared with the photoelectrochemical reaction device 20 illustrated in FIG. 9. The photoelectrochemical reaction device 20 illustrated in FIG. 13 is different at least in that that the product flow path 27 is provided on the porous layer 26 and the electrolytic solution 24 is provided which is stored in another container and in contact with the porous layer 26 as compared with the photoelectrochemical reaction device 20 illustrated in FIG. 9. In this case, the product flow path 27 may be provided, for example, in a gap between a plurality of photoelectrochemical reaction devices when they are arranged side by side. Since the vaporized product is likely to move upward, providing the product flow path 27 on the porous layer 26 makes it possible to increase the recovery efficiency of the product utilizing gravity.

Figure 14:
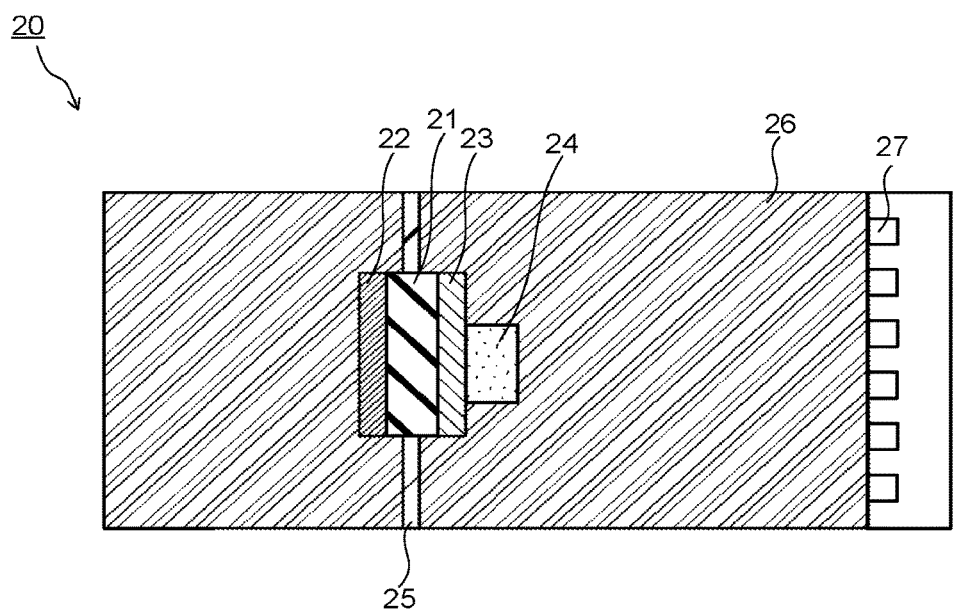
FIG. 14 is a schematic view illustrating a configuration example of the photoelectrochemical reaction device in the second embodiment.

The photoelectrochemical reaction device 20 illustrated in FIG. 14 is different at least in that that the electrolytic solution 24 is provided which is in contact with a part of the reduction electrode layer 23 as compared with the photoelectrochemical reaction device 20 illustrated in FIG. 9. The contact of the electrolytic solution 24 with the reduction electrode layer 23 allows the reduction electrode layer 23 to perform the reduction reaction using both of the liquid electrolytic solution 24 and the vaporized electrolytic solution 24 component. Note that a plurality of electrolytic solution flow paths may be provided, for instance, such that an electrolytic solution flow path from which the electrolytic solution 24 is supplied may be a first electrolytic solution flow path, and a second electrolytic solution flow path may be provided in the porous layer 26 so that by discharging the electrolytic solution through the second electrolytic solution flow path and changing the electrolytic solution 24 and the electrolytic solution component, reacting species can be changed. In particular, in reaction using natural energy such as sunlight, an input energy is irregular, and therefore the electrolytic solution may be changed so as to select a reaction suitable for the energy to be obtained. Further, the plurality of electrolytic solution flow paths may be provided in different members such as the porous layer 26 and the product flow path 27. This enables efficient use of flow paths suitable for the respective electrolytic solutions.

Figure 15:
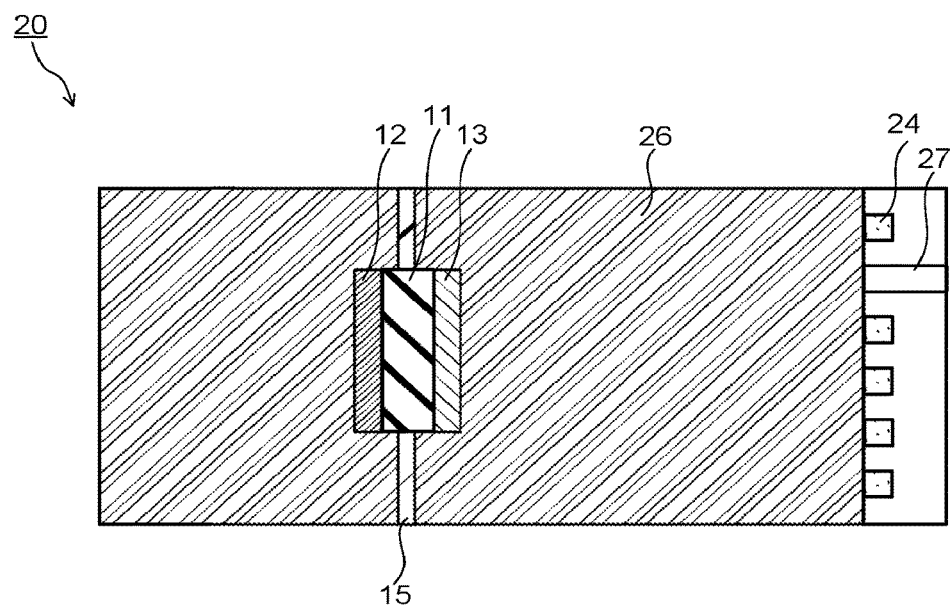
FIG. 15 is a schematic view illustrating a configuration example of the photoelectrochemical reaction device in the second embodiment.

The photoelectrochemical reaction device 20 illustrated in FIG. 15 is different at least in that that the porous layer 26 is provided which is in contact with the electrolytic solution 24 supplied from the electrolytic solution flow path and the product flow path 27 is provided which is in contact with the porous layer 26 as compared with the photoelectrochemical reaction device 20 illustrated in FIG. 9. As illustrated in FIG. 15, the electrolytic solution flow path from which the electrolytic solution 24 is supplied and the product flow path for recovering the product can be separated to selectively collect a gaseous component generated from the electrolytic solution component to the product flow path 27 when the gaseous component is contained in the product so as to reduce bubbles in the electrolytic solution flow path and thereby suppress a gas-liquid two-phase flow. Suppression of the gas-liquid two-phase flow preferably decreases energy loss relating to circulation of liquid and improves the stability of the flow rate and the accuracy of measurement of the flow rate. A part of the electrolytic solution component may change to solid. For example, the solubility of the part of the electrolytic solution component heated by the irradiated light may change due to the temperature change inside the pipe used the photoelectrochemical reaction device or the product flow path. In this case, the product flows inside the pipe in three phases of gas-phase, liquid-phase, and solid-phase. This increases energy loss. The three-phase flow including gas-phase, liquid-phase, and solid-phase may be referred to as a the gas-liquid-solid three-phase flow. The photoelectrochemical reaction device in the embodiment, for example, prevents the generation of a physical solid formed in the device and a solid formed by corrosion of a member such as the photovoltaic layer, the oxidation electrode layer, the reduction electrode layer, the electrolytic solution, and the ion exchange membrane Since a performance of suppressing the gas-liquid two-phase flow is excellent when the product flow path exists near the electrolytic solution flow path in a range where gas-liquid separation is performed, it is preferable to provide the electrolytic solution flow path and the product flow path. In this case, it is preferable to make the pressure applied to the electrolytic solution 24 in the electrolytic solution flow path from which the electrolytic solution 24 is supplied higher than the pressure in the product flow path 27. Further, commonalization of the product flow path and the electrolytic solution flow path is preferable in terms of manufacturability and cost.

Note that parts of the photoelectrochemical reaction devices 20 illustrated in FIG. 9 to FIG. 15 can be appropriately exchanged with each other. Further, at least parts of the photoelectrochemical reaction devices 20 illustrated in FIG. 9 to FIG. 15 can be appropriately combined together.

Third Embodiment

Figure 16:
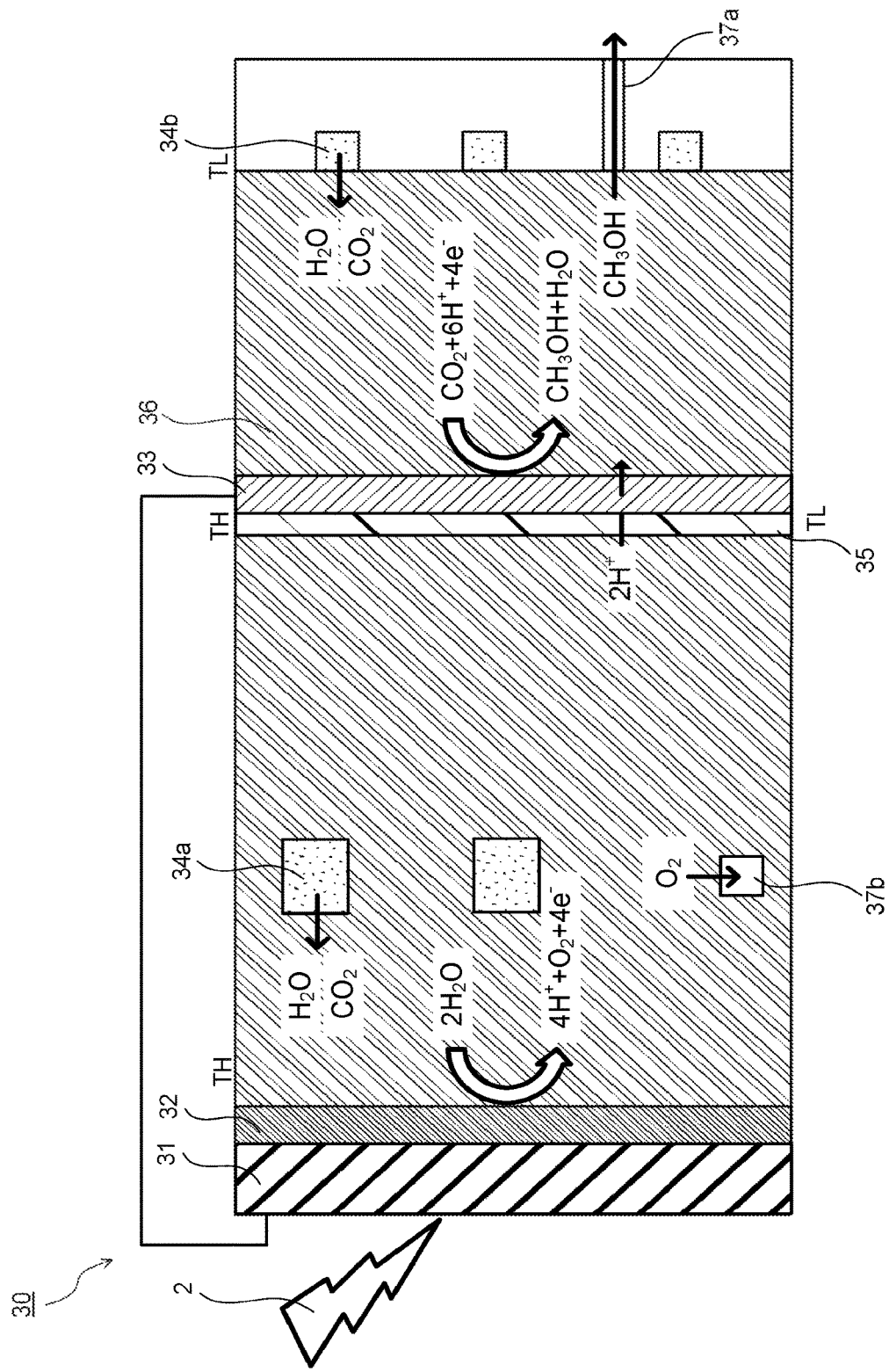
FIG. 16 is a schematic view illustrating a configuration example and an operation example of a photoelectrochemical reaction device in a third embodiment.

FIG. 16 is a schematic view illustrating a configuration example of a photoelectrochemical reaction device. A photoelectrochemical reaction device 30 illustrated in FIG. 16 includes a photovoltaic layer 31, an oxidation electrode layer 32, a reduction electrode layer 33, electrolytic solutions 34a, 34b, an ion exchange membrane 35, a porous layer 36, and product flow paths 37a, 37b.

As the photovoltaic layer 31, a layer applicable to the photovoltaic layer 11 can be used. In addition, the description of the photovoltaic layer 11 can be appropriately employed for the description of the photovoltaic layer 31.

The oxidation electrode layer 32 is in contact with a first face of the photovoltaic layer 31, and the reduction electrode layer 33 is electrically connected to a second face of the photovoltaic layer 31. Note that light is irradiated to the second face of the photovoltaic layer 31. The reduction electrode layer 33 has fine pores. Provision of the fine pores allows hydrogen ions or the like to migrate via the reduction electrode layer 33. Further, in FIG. 16, the reduction electrode layer 33 separates the porous layer 36 into a first region and a second region. This makes it possible to separately recover the product by the oxidation reaction and the product by the reduction reaction. As the oxidation electrode layer 32, a layer of a material applicable to the oxidation electrode layer 12 can be used. As the reduction electrode layer 33, a layer of a material applicable to the reduction electrode layer 13 can be used. In addition, the description of the oxidation electrode layer 12 and the reduction electrode layer 13 can be appropriately employed for the description of the oxidation electrode layer 32 and the reduction electrode layer 33. The position of the reduction electrode layer 33 is arbitrary and, for example, when it is not in the stack structure with the ion exchange membrane 35, the reduction electrode layer 33 does not have to have the fine pores. Further, though not illustrated, a plurality of reduction electrode layers 33 may be provided. By changing the reduction catalyst and the area of the reduction electrode layer 33, the product can be changed. Further, as described above, it is also possible to provide a plurality of electrolytic solution flow paths and switch the reacting species depending on the situation by an electric circuit or the like.

An electrolytic solution 34a and an electrolytic solution 34b are provided to be separated from the oxidation electrode layer 32 and the reduction electrode layer 33. The electrolytic solution 34a and the electrolytic solution 34b are supplied, for example, from the electrolytic solution flow path. The electrolytic solution 34a is utilized mainly for the oxidation reaction of the oxidation electrode layer 32, and the electrolytic solution 34b is utilized mainly for the reduction reaction of the reduction electrode layer 33. As the electrolytic solution 34a and the electrolytic solution 34b, for example, an electrolytic solution of a material applicable to the electrolytic solution 14 can be used. In addition, the description of the electrolytic solution 14 can be appropriately employed for the description of the electrolytic solution 34a and the electrolytic solution 34b. Note that the electrolytic solution 34a and the electrolytic solution 34b may be different electrolytic solutions. For example, an electrolytic solution containing water may be used as the electrolytic solution 34a, and an electrolytic solution containing at least one of water and carbon dioxide may be used as the electrolytic solution 34b.

As the ion exchange membrane 35, a membrane of a material applicable to the ion exchange membrane 15 can be used. The ion exchange membrane 35 has a function of allowing permeation of at least one kind of ion between the oxidation electrode layer 32 and the reduction electrode layer 33. In addition, the description of the ion exchange membrane 15 can be appropriately employed for the description of the ion exchange membrane 35.

The porous layer 36 is provided to be in contact with the oxidation electrode layer 32, the reduction electrode layer 33, the electrolytic solution 34a, the electrolytic solution 34b, the product flow path 37a, and the product flow path 37b. Further, the porous layer 36 has fine pores through which the electrolytic solution 34a or the electrolytic solution 34b passes. Note that the product produced by the oxidation reaction or the reduction reaction may be allowed to pass through the fine pores. This enables gas or liquid to move among the oxidation electrode layer 32, the reduction electrode layer 33, the electrolytic solution 34a, and the electrolytic solution 34b via the porous layer 36. The porous layer 36 has a function of supplying the electrolytic solution 34a to the oxidation electrode layer 32 while vaporizing it and supplying the electrolytic solution 34b to the reduction electrode layer 33 while vaporizing it. In this case, the porous layer 36 does not have to have the function of purifying the product produced by the oxidation reaction or the reduction reaction. As the porous layer 36, for example, a layer of a material applicable to the porous layer 16 may be used.

The product flow path 37a is in contact with the porous layer 36, and the product flow path 37b is in contact with the porous layer 36 and surrounded by the porous layer 36 in FIG. 16. The product flow path 37a is provided in contact with, for example, the first region of the porous layer 36, and the product flow path 37b is provided in contact with, for example, the second region of the porous layer 36. The product flow path 37a is a product recovery flow path provided for recovering the product such as hydrogen or a carbon compound produced by the reduction reaction. Note that the hydrogen and the carbon compound may be recovered through different product flow paths 37a. The product flow path 37b is provided for recovering oxygen produced by the oxidation reaction. Note that the product flow path 37a recovers the product through a passage different from the electrolytic solution flow path from which the electrolytic solution 34b is supplied. This can suppress the gas-liquid two-phase flow and the gas-liquid-solid three-phase flow.

Next, an operation example of the photoelectrochemical reaction device illustrated in FIG. 16 will be described. Here, the case of producing methanol will be described as an example. In the photoelectrochemical reaction device 30 illustrated in FIG. 16, a temperature gradient is given to the porous layer 36 to vaporize the electrolytic solution 34a and the electrolytic solution 34b. For example, portions of the porous layer 36 near the oxidation electrode layer 32 and the reduction electrode layer 33 are set to a high temperature TH and portions of the porous layer 36 near the product flow path 37a and product flow path 37b are set to a low temperature TL.

In this case, the electrolytic solution 34a vaporizes, whereby water vapor being gas diffuses to the vicinity of the oxidation electrode layer 32, and the electrolytic solution 34b vaporizes, whereby carbon dioxide diffuses, while moving in the porous layer 36, to the vicinity of the reduction electrode layer 33.

Further, when light 2 is incident on the photovoltaic layer 31, the photovoltaic layer 31 absorbs the light 2 and generates photoexcited electrons and holes to thereby perform charge separation. In this event, the holes gather on the oxidation electrode layer 32 side and the photoexcited electrons gather on the reduction electrode layer 33 side. This causes electromotive force in the photovoltaic layer 31.

When the holes gather in the oxidation electrode layer 32, the oxidation reaction of water occurs as in the above formula (1) to produce oxygen and hydrogen ions. The oxygen produced by the oxidation reaction can be recovered through the product flow path 37b. Further, the hydrogen ions permeate the ion exchange membrane 35 and migrate to the reduction electrode layer 33 side.

When the photoexcited electrons gather in the reduction electrode layer 33, the reduction reaction of carbon dioxide occurs as in the above formula (2), and carbon dioxide and hydrogen ions react to produce methanol being a carbon compound and water. Further, the produced methanol moves through the porous layer 36. The porous layer 36 repeatedly performs vaporization and liquefaction of methanol by the temperature gradient to rectify the methanol, which can be recovered through the product flow path 37a. Recovery of oxygen and hydrogen, and the product such as the carbon compound through different flow paths can suppress a gas-liquid two-phase flow and the gas-liquid-solid three-phase flow.

The ratio of methanol to be vaporized is decided by a ratio of concentration of methanol. Further, the recovered methanol is methanol that is condensed more than the methanol produced by the reduction reaction. As described above, also the photoelectrochemical reaction device illustrated in FIG. 16 can refine the product with a high conversion efficiency. Further, generation of carbon monoxide enables reduction of water vapor. Also in the of case of increasing the volume density by compressing or liquefying the produced gas, the product containing no water vapor is more preferable and desirable for use thereafter, and therefore existence of the porous layer is applied not only to the liquid component such as methanol to be mixed with water. Further, vaporizing and supplying the electrolytic solution 34a and the electrolytic solution 34b to the oxidation electrode layer 32 or the reduction electrode layer 33 increases the efficiency of the oxidation reaction or the reduction reaction by the catalyst as compared with a liquid electrolytic solution, and can increase the purity of the product because of less impurities such as moisture.

Figure 17:
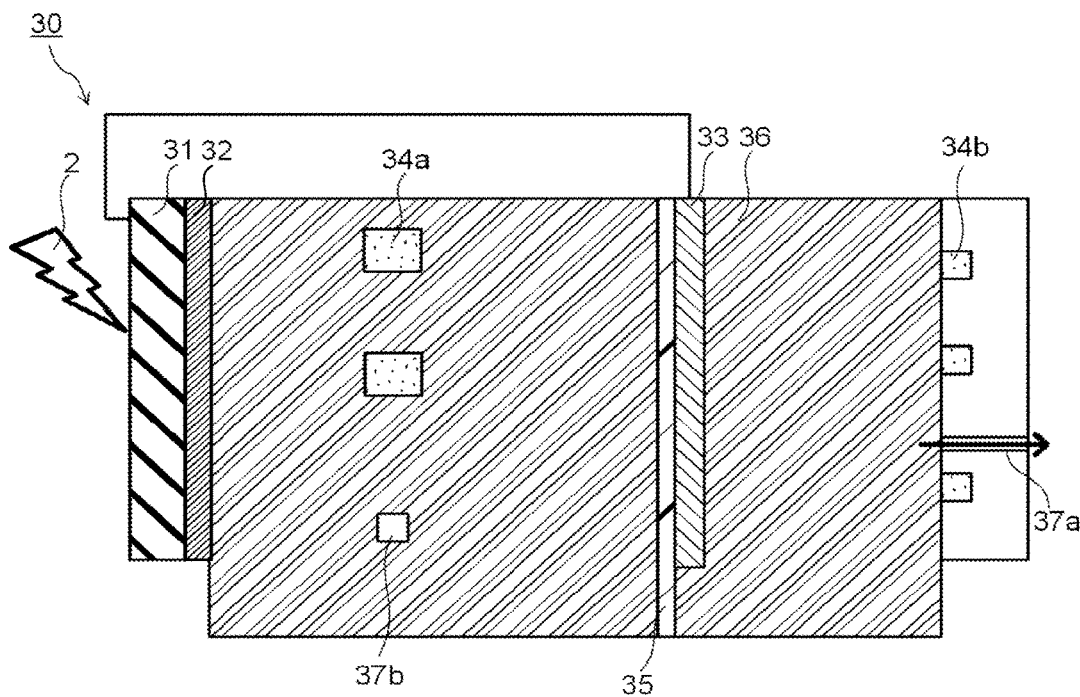
FIG. 17 is a schematic view illustrating a configuration example of the photoelectrochemical reaction device in the third embodiment.
Figure 18:
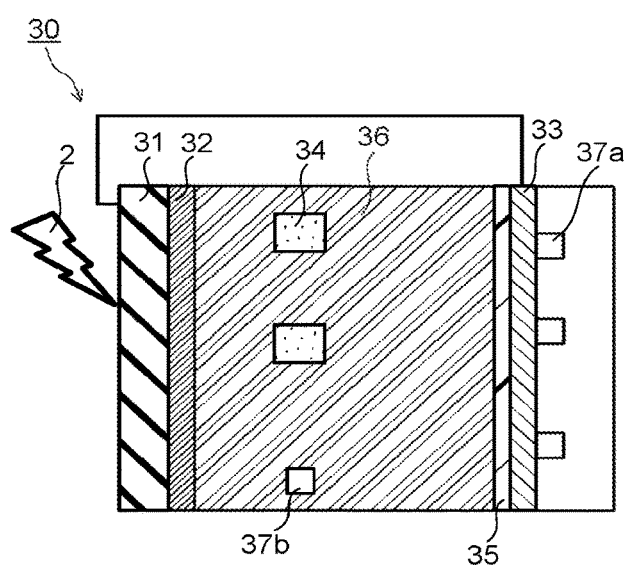
FIG. 18 is a schematic view illustrating a configuration example of the photoelectrochemical reaction device in the third embodiment.

Note that the photoelectrochemical reaction device in this embodiment is not limited to the configuration illustrated in FIG. 16. Other examples of the photoelectrochemical reaction device in this embodiment will be described below referring to FIG. 17 and FIG. 18. FIG. 17 and FIG. 18 are schematic views illustrating the other examples of the photoelectrochemical reaction device. Note that for the same parts as those in the photoelectrochemical reaction device illustrated in FIG. 16, the description of FIG. 16 is appropriately employed.

The photoelectrochemical reaction device 30 illustrated in FIG. 17 is different at least in that the reduction electrode layer 33 is in contact with a part of the ion exchange membrane 35, namely, the ion exchange membrane 35 has a region not in contact with the reduction electrode layer 33 as compared with the photoelectrochemical reaction device 30 illustrated in FIG. 16. The ion exchange membrane 35 has the region not in contact with the reduction electrode layer 33 and thereby facilitates migration of hydrogen ions. The photoelectrochemical reaction device 30 illustrated in FIG. 18 is different at least in that an electrolytic solution 34 is provided in place of the electrolytic solution 34a and the electrolytic solution 34b and the reduction electrode layer 33 is in contact with the product flow path 37a as compared with the photoelectrochemical reaction device 30 illustrated in FIG. 16. In this case, as the electrolytic solution 34, an electrolytic solution applicable to the electrolytic solution 14 can be used. A configuration that the reduction electrode layer 33 is in contact with the product flow path 37a makes it possible to efficiently recover the product.

Note that parts of the photoelectrochemical reaction devices 30 illustrated in FIG. 16 to FIG. 18 can be appropriately exchanged with each other. Further, at least parts of the photoelectrochemical reaction devices 30 illustrated in FIG. 16 to FIG. 18 can be appropriately combined together.

It should be note that embodiments have been presented by way of example only, and are not intended to limit the scope of the inventions. These novel embodiments may be embodied in a variety of other forms, and various omissions, substitutions and changes may be made without departing from the spirit of the inventions. These embodiments and modifications thereof are included in the scope and spirit of the inventions and included in the inventions described in the claims and their equivalents. Further, the configuration of a part of one embodiment may be replaced with the configuration of a part of another embodiment. Furthermore, the configuration of at least a part of one embodiment may be combined with the configuration of at least a part of another embodiment.

What is claimed is:

1. A photoelectrochemical reaction device, comprising:
a photovoltaic layer having a first face and a second face opposite each other and configured to perform charge separation by energy of light irradiated to the first face or the second face;
an oxidation electrode layer electrically connected to the first face and configured to cause an oxidation reaction of water;
a reduction electrode layer electrically connected to the second face and configured to cause a reduction reaction of at least one of water and carbon dioxide;
a tank to store a first electrolytic solution and a second electrolytic solution, the first electrolytic solution containing water and being configured to be supplied to the oxidation electrode layer, the second electrolytic solution containing at least one selected from the group consisting of water and carbon dioxide and being configured to be supplied to the reduction electrode layer; and
a porous layer, being provided in the tank to contact with the oxidation electrode layer or the reduction electrode layer, having fine pores through which an oxidation product and the first electrolytic solution or a reduction product and the second electrolytic solution pass, and being configured to get a temperature gradient and thus purify the oxidation product or the reduction product and vaporize the first electrolytic solution or the second electrolytic solution.

2. The device of claim 1, wherein:
the reduction product and the oxidation product respectively contains hydrogen and oxygen; at least a part of the reduction product or the oxidation product is configured to be repeatedly vaporized and liquefied by moving from a high temperature side to a low temperature side of the porous layer through the fine pores, to remove moisture in the reduction product or the oxidation product and to thereby extract the hydrogen or the oxygen.

3. The device of claim 1, wherein
the reduction product contains a carbon compound; and
the porous layer is configured to repeatedly perform vaporization and liquefaction of at least a part of the reduction product while moving the reduction product from a high temperature side to a low temperature side through the fine pores to rectify the carbon compound.

4. The device of claim 1, wherein the porous layer is in contact with the oxidation electrode layer and the reduction electrode layer.

5. The device of claim 1, further comprising:
a product flow path in contact with the porous layer.

6. The device of claim 5, wherein the product flow path is provided on the porous layer.

7. The device of claim 5, wherein the product flow path is surrounded by the porous layer.

8. The device of claim 1, wherein:
the porous layer has a first region and a second region; and
the reduction electrode layer is provided to separate the first region and the second region.

9. The device of claim 8, further comprising:
a first product flow path in contact with the first region; and
a second product flow path in contact with the second region.

10. The device of claim 1, wherein the porous layer is provided on the first electrolytic solution or the second electrolytic solution.

11. The device of claim 1, wherein the porous layer is provided on the tank.

12. The device of claim 1, wherein the porous layer is hydrophobic and conductive.

13. The device of claim 1, further comprising:
a first electrolytic solution path through which the first electrolytic solution passes to the oxidation electrode layer, or a second electrolytic solution path through which the second electrolytic solution passes to the reduction electrode layer.

14. The device of claim 1, wherein:
the oxidation electrode layer is provided on the first face, and
the reduction electrode layer is provided on the second face.

15. The device of claim 1, wherein the porous layer contains an oxidation catalyst for the oxidation reaction or a reduction catalyst for the reduction reaction.

* * * * *